US012657650B2

(12) United States Patent
Thiery et al.

(10) Patent No.: US 12,657,650 B2
(45) Date of Patent: Jun. 16, 2026

(54) CONFORMAL CAGE-BASED DEFORMATION WITH POLYNOMIAL CURVES

(71) Applicant: ADOBE INC., San Jose, CA (US)

(72) Inventors: Jean Marc Christian Marie Thiery, Paris (FR); Élie Louis Simon Michel, Paris (FR)

(73) Assignee: ADOBE INC., San Jose, CA (US)

( * ) Notice: Subject to any disclaimer, the term of this patent is extended or adjusted under 35 U.S.C. 154(b) by 116 days.

(21) Appl. No.: 18/328,601

(22) Filed: Jun. 2, 2023

(65) Prior Publication Data

US 2024/0403996 A1     Dec. 5, 2024

(51) Int. Cl.
*G06T 3/04*       (2024.01)
*G06T 7/13*       (2017.01)
*G06T 11/60*      (2026.01)

(52) U.S. Cl.
CPC ................ *G06T 3/04* (2024.01); *G06T 7/13* (2017.01); *G06T 11/60* (2013.01); *G06T 2210/44* (2013.01)

(58) Field of Classification Search
CPC ... G06T 3/04; G06T 7/13; G06T 11/60; G06T 2210/44
See application file for complete search history.

(56) References Cited

U.S. PATENT DOCUMENTS 8,587,584 B1    11/2013  DeRose et al.
2010/0214312 A1*  8/2010  Weber ..................... G06T 13/80
345/647

2011/0149340 A1*  6/2011  Lipman ................... G06T 19/20
358/1.15
2014/0172388 A1*  6/2014  Yamakawa ............. G06T 17/20
703/2
2015/0334276 A1*  11/2015  Ecker .................... G06T 3/4038
348/76
2015/0356704 A1*  12/2015  Lipman .................. G06T 13/20
703/1

(Continued)

OTHER PUBLICATIONS

Goes, F., D., and James, D., L., "Regularized Kelvinlets: Sculpting Brushes based on Fundamental Solutions of Elasticity", ACM Transactions on Graphics, vol. 36, No. 4, Article 40, pp. 1-11 (Jul. 2017).

(Continued)

*Primary Examiner* — Jin Cheng Wang
(74) *Attorney, Agent, or Firm* — Shook, Hardy & Bacon L.L.P.

(57)                ABSTRACT

Methods and systems are provided for conformal cage-based deformation with polynomial curves. In embodiments described herein, a cage model in a first configuration is displayed along with an image. The cage model in the first configuration defines a boundary of at least a portion of points of the image. Curve control points are generated along the boundary of the cage model. The cage model is deformed from the first configuration to a second configuration by changing the location of curve control points thereby changing curvature of a corresponding portion of the boundary of the cage model. Based on the first and second configuration of the cage model, an updated image is generated by performing a conformal transformation of the points of the image within the boundary of the cage model in the first configuration. The updated image is then displayed.

20 Claims, 7 Drawing Sheets

(56) References Cited

U.S. PATENT DOCUMENTS

| | | | | |
|---|---|---|---|---|
| 2016/0275659 A1* | 9/2016 | Nimura | .................. | G06T 3/18 |
| 2017/0262163 A1* | 9/2017 | Nimura | .................. | G06T 3/10 |
| 2017/0270696 A1* | 9/2017 | Schiller | .............. | G06T 11/203 |
| 2018/0061092 A1* | 3/2018 | Sasikumar | ........... | G06T 11/203 |
| 2018/0151515 A1* | 5/2018 | Grayson | .............. | G01R 27/14 |
| 2019/0180432 A1* | 6/2019 | Xin | ......................... | G06V 10/56 |
| 2019/0206100 A1* | 7/2019 | Batra | .................... | G06T 11/40 |
| 2019/0228577 A1* | 7/2019 | Gregory | ............... | G06T 17/20 |
| 2019/0295217 A1* | 9/2019 | Phogat | ................. | G06T 3/18 |
| 2020/0005537 A1* | 1/2020 | Inagaki | ............... | G06T 19/20 |
| 2020/0334874 A1* | 10/2020 | Phogat | ................ | G06T 11/001 |
| 2020/0388082 A1* | 12/2020 | Peterson | ............. | G06T 17/205 |
| 2023/0056102 A1* | 2/2023 | Guillemain | ............ | G06T 7/11 |
| 2024/0193328 A1* | 6/2024 | Sharma | ................. | G06F 30/27 |
| 2024/0355051 A1* | 10/2024 | Ahn | ....................... | G06T 19/20 |
| 2024/0428546 A1* | 12/2024 | Yang | .................... | H04N 23/80 |

OTHER PUBLICATIONS

Farbman, Z., et al., "Coordinates for Instant Image Cloning", ACM Transactions on Graphics, vol. 28, No. 3, pp. 1-9 (2009).

Floater, M., S., "Mean value coordinates", Computer Aided Geometric Design, vol. 20. Issue. 1, pp. 19-27 (2003).

Hormann, K., and Floater, M., S., "Mean Value Coordinates for Arbitrary Planar Polygons", ACM Transactions on Graphics, vol. 25, No. 4, pp. 1424-1441 (2006).

Hou, F., et al., "Poisson Vector Graphics (PVG) and Its Closed-Form Solver", arXiv:1701.04303v1, pp. 1-22 (Jan. 16, 2017).

Hou, F., et al., "Poisson Vector Graphics (PVG)", IEEE Transactions On Visualization And Computer Graphics, vol. 26, Issue 2, pp. 1361-1371 (2018).

Huang, J., et al., "Subspace Gradient Domain Mesh Deformation", In ACM SIGGRAPH, pp. 1126-1134 (2006).

Ilbery, P., et al., "Biharmonic Diffusion Curve Images from Boundary Elements", ACM Transactions on Graphics, vol. 32, No. 6, pp. 1-12 (Nov. 2013).

Joshi, P., et al., "Harmonic Coordinates for Character Articulation", ACM Transactions on Graphics, vol. 26, No. 3, Article 71, pp. 1-10 (Jul. 2007).

Ju, T., et al., "Mean Value Coordinates for Closed Triangular Meshes", In ACM SIGGRAPH Papers, vol. 2, pp. 561-566 (2005).

Li, X., Y., et al., "Cubic Mean Value Coordinates", ACM Transactions on Graphics, vol. 32, No. 4, Article 126 pp. 1-10 (2013).

Lipman, Y., et al., "GPU-assisted Positive Mean Value Coordinates for Mesh Deformations", In Fifth Symposium on Geometry Processing, pp. 1-7 (2007).

Lipman, Y., et al., "Green Coordinates", ACM Transactions on Graphics, vol. 27, No. 3, pp. 1-10 (2008).

Schaefer, S., et al., "Image Deformation Using Moving Least Squares", In ACM SIGGRAPH Papers, pp. 533-540 (2006).

Sederberg, T., W., and Parry, S., R., "Free-Form Deformation of Solid Geometric Models", In Proceedings of the 13th annual conference on Computer graphics and interactive techniques, vol. 20, No. 4, pp. 151-160 (1986).

Sun, X., et al., "Diffusion Curve Textures for Resolution Independent Texture Mapping", ACM Transactions on Graphics, vol. 31, No. 4, Article 74, pp. 1-9 (Jul. 2012).

Thiery, J., M., et al., "Mean value coordinates for quad cages in 3D", ACM Transactions on Graphics, vol. 37, No. 6, Article 229, pp. 1-14 (Nov. 2018).

Weber, O., et al., "Complex Barycentric Coordinates with Applications to Planar Shape Deformation", In Computer Graphics Forum, EUROGRAPHICS, vol. 28, No. 2, pp. 1-11 (2009).

Weber, O., et al., "Biharmonic Coordinates", In Computer Graphics Forum, vol. 31, Issue 8, pp. 2409-2422 (2012).

Thiery, J., M., and Boubekeur, T., "Green Coordinates for Triquad Cages in 3D", In SIGGRAPH Asia 2022 Conference Papers, vol. 1, No. 1, pp. 1-7 (2022).

Michel, E., and Thiery, J., M., "Polynomial 2D Green Coordinates for Polygonal Cages", In Special Interest Group on Computer Graphics and Interactive Techniques Conference Conference Proceedings (SIGGRAPH '23 Conference Proceedings), ACM, pp. 1-9 (2023).

Co-Pending U.S. Appl. No. 17/947,035, filed Sep. 16, 2022.

* cited by examiner

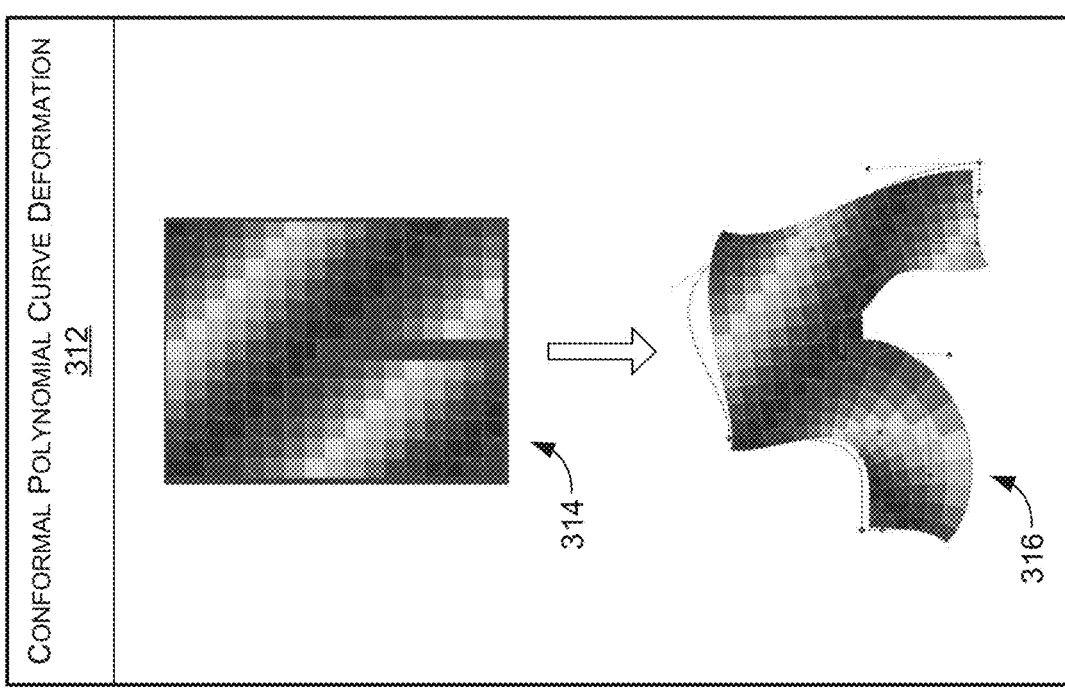
CONFORMAL POLYNOMIAL CURVE DEFORMATION 312
314
316
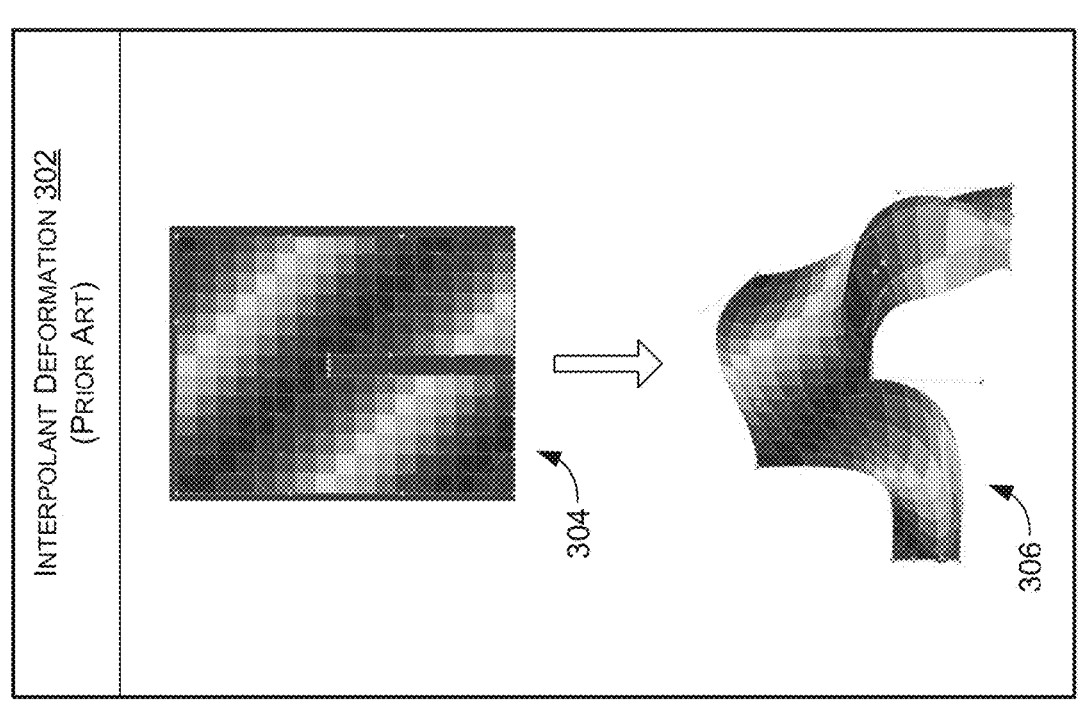
INTERPOLANT DEFORMATION 302 (PRIOR ART)
304
306
FIG. 3

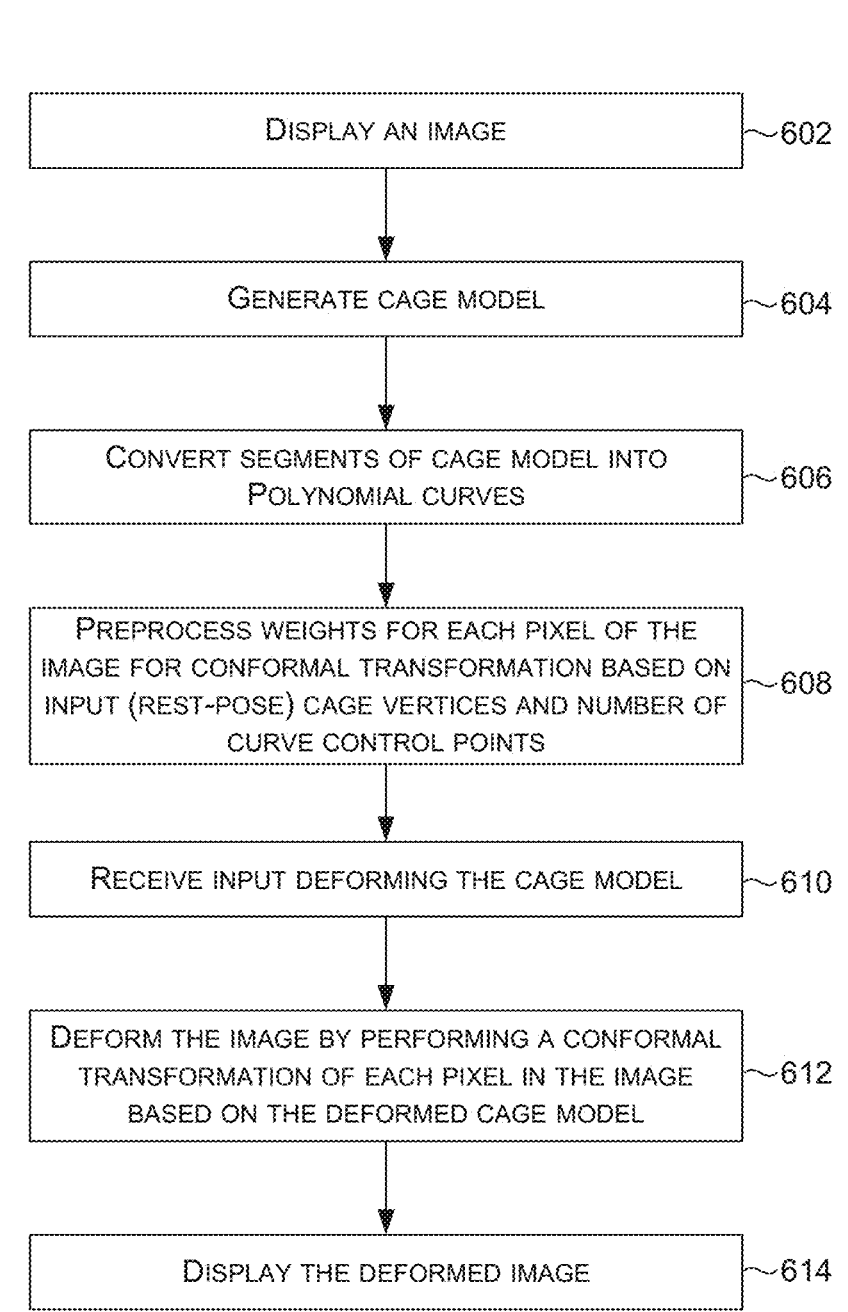

600

DISPLAY AN IMAGE — 602

GENERATE CAGE MODEL — 604

CONVERT SEGMENTS OF CAGE MODEL INTO POLYNOMIAL CURVES — 606

PREPROCESS WEIGHTS FOR EACH PIXEL OF THE IMAGE FOR CONFORMAL TRANSFORMATION BASED ON INPUT (REST-POSE) CAGE VERTICES AND NUMBER OF CURVE CONTROL POINTS — 608

RECEIVE INPUT DEFORMING THE CAGE MODEL — 610

DEFORM THE IMAGE BY PERFORMING A CONFORMAL TRANSFORMATION OF EACH PIXEL IN THE IMAGE BASED ON THE DEFORMED CAGE MODEL — 612

DISPLAY THE DEFORMED IMAGE — 614

FIG. 6

CONFORMAL CAGE-BASED DEFORMATION WITH POLYNOMIAL CURVES

BACKGROUND

Conventional cage-based deformation techniques using cage coordinates allow artists to deform images by merely manipulating sparse value constraints of a boundary of the image. This boundary is typically formed by a polygon and is referred to as the cage. The artist drags a control point of the cage to deform the cage. The image is then deformed relative to the deformation of the cage.

SUMMARY

Various aspects of the technology described herein are generally directed to systems, methods, and computer storage media for, among other things, conformal cage-based deformation with polynomial curves. In this regard, embodiments described herein facilitate the conformal deformation of the parts of an image inside a polygonal cage, as a direct result of deforming each cage segment into a polynomial curve. For example, a cage model is drawn around an image by selecting the vertices of the cage model. Curve control points, which allow the adjustment of the curvature of the segment of the cage model, are generated by converting each segment from a straight segment to a polynomial arc of any degree. The cage model is then deformed by adjusting the curve control points. In response to the deformation of the cage model, the image is then deformed by performing a conformal transformation of each pixel of the image in relation to the deformed cage model. Preprocessed weights (e.g., cage coordinates) for each pixel of the image can be determined merely based on the input (rest-pose) cage vertices and number of curve control points in order to facilitate fast and efficient conformal deformation of the image so that the deformed image can be displayed in real-time or as close to real-time as possible.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 provides an example diagram of cage-based deformation of an exemplary image comparing interpolant cage-based deformation, in accordance with the prior art, to conformal cage-based deformation with polynomial curves, specifically polynomial curves of the third-degree (e.g., cubic Bézier curves), in accordance with embodiments of the present disclosure.

FIG. 6 provides an example flow diagram of conformal cage-based deformation with polynomial curves, in accordance with embodiments of the present disclosure.

DETAILED DESCRIPTION

Conventional cage-based deformation techniques using cage coordinates allow artists to deform images by merely manipulating sparse value constraints of a boundary of the image. This boundary is typically formed by a polygon and is referred to as the cage. The cage coordinates are used to define scalar and vector fields over the whole domain within the cage. Cage coordinates are used for instance to easily define deformation fields or color fields in image editing applications. In order to deform the image, the artist drags a control point of the cage to deform the cage. The image is then deformed relative to the deformation of the cage.

Generally, conventional cage-based deformation methods based on mean value coordinates ("MVC"), for example, cubic MVC, allow for the deformation of each cage segment into curved elements, specifically cubic curves (i.e., polynomial curves of the third-degree). However, conventional cage-based deformation methods based on MVC, including cubic MVC, deform the 2-D image by interpolating the signal along the cage deformed boundary, which in turns prevents preserving local aspects of the image (i.e., the transformation is non-conformal). Further, conventional cage-based deformation based on cubic MVC is limited to cubic curves and does not allow for polynomial curves of a higher degree. Conventional cage-based deformation techniques based on Green Coordinates ("GC") allow for conformal deformation of the 2-D image, which guarantees exact local aspect preservation. However, conventional cage-based deformation techniques based on GC do not allow for curved segments or polynomial curves of any degree.

Embodiments described herein present a novel solution for conformal cage-based deformation with polynomial curves. In some configurations, the solution is based on a novel solution to Green's third identity using polynomial curves described in further detail below. Further, embodiments described herein present an optimized implementation of the algorithm for conformal cage-based deformation with polynomial curves by preprocessing computationally heavy portions of the conformal transformation allowing the deformed image to be displayed in real-time or as close to real-time as possible.

Figure 4:
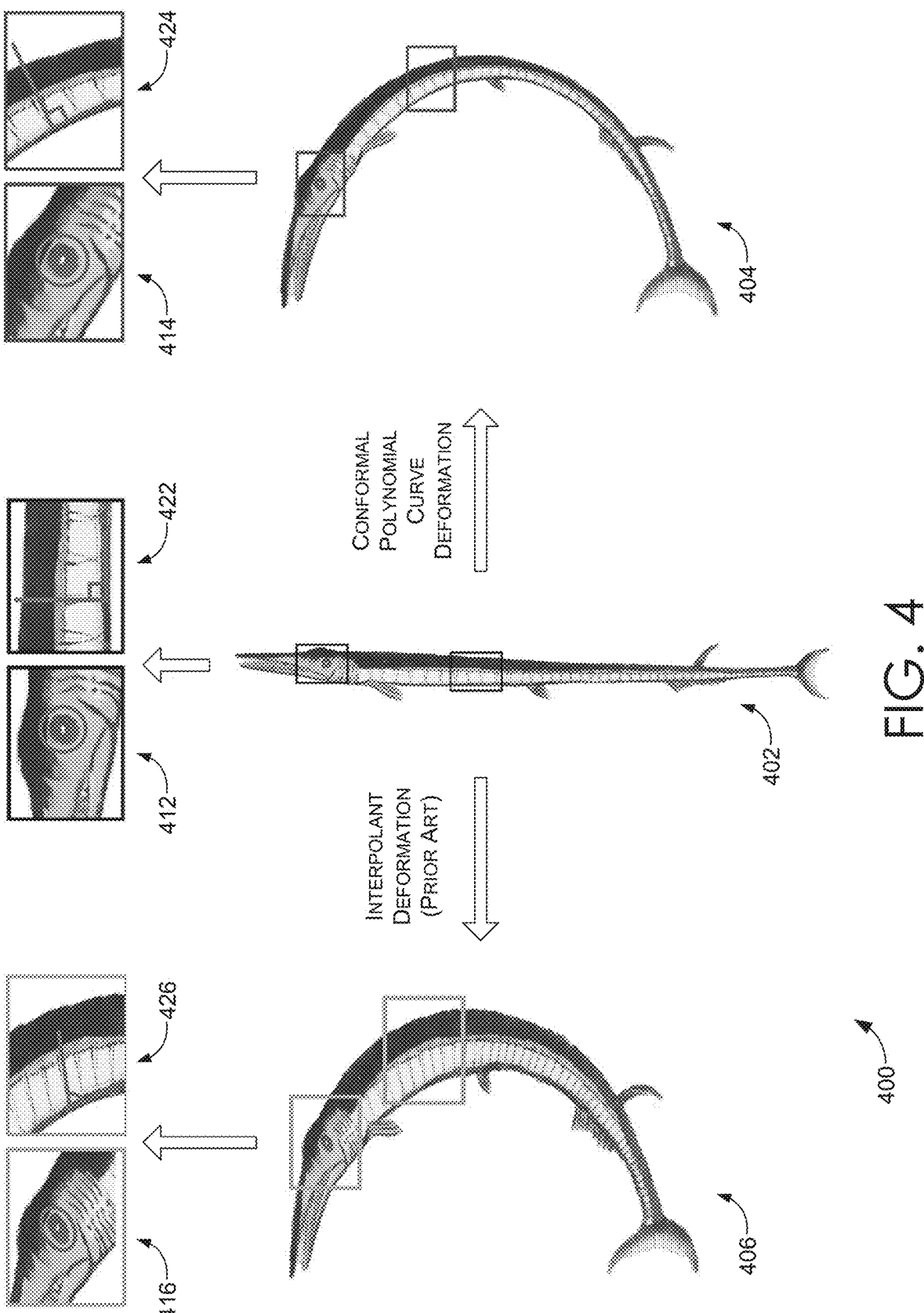
FIG. 4 provides another example diagram of cage-based deformation of an exemplary image comparing interpolant cage-based deformation, in accordance with the prior art, to conformal cage-based deformation with polynomial curves, specifically polynomial curves of the third-degree (e.g., cubic Bézier curves), in accordance with embodiments of the present disclosure.
Figure 5:
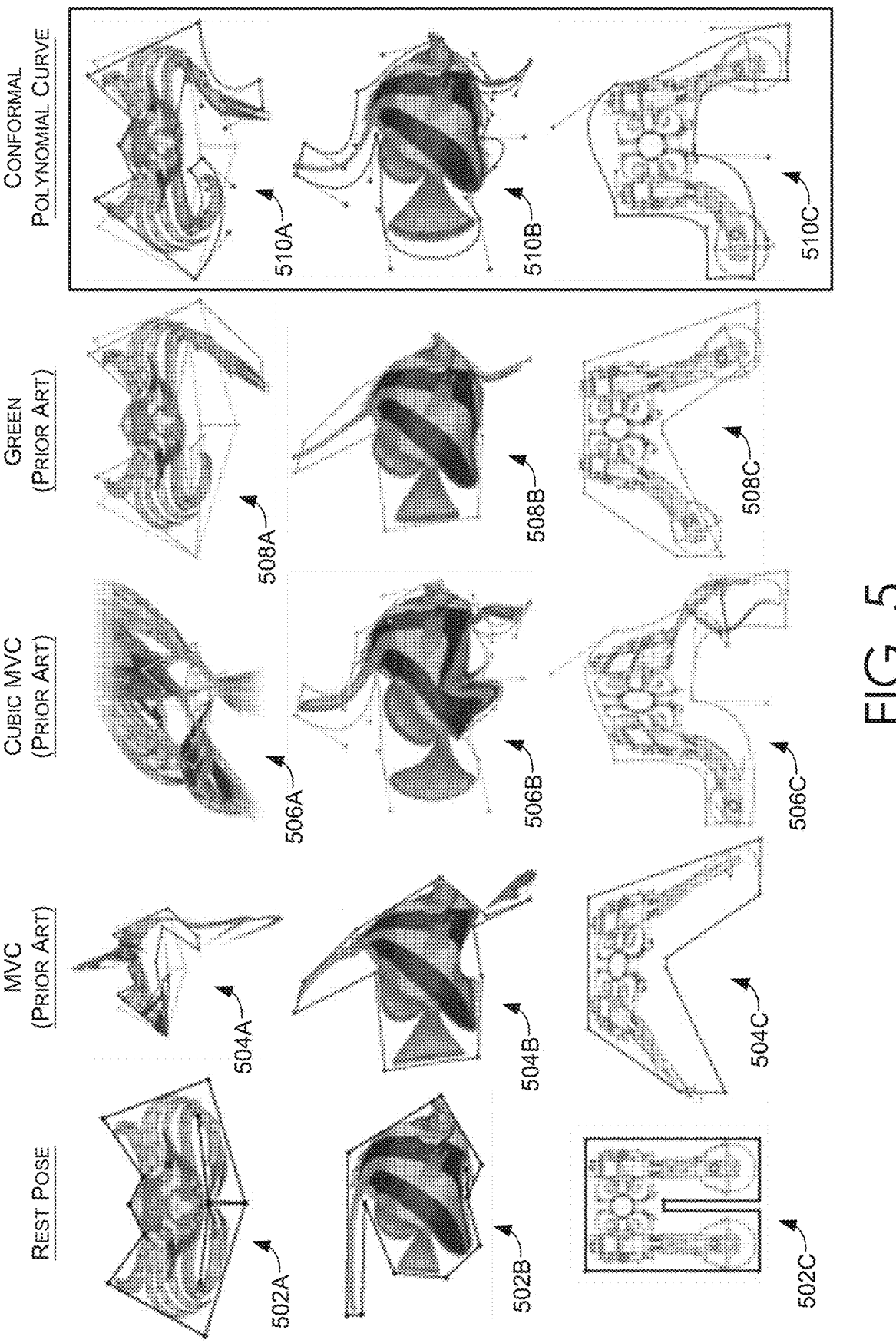
FIG. 5 provide examples of cage-based deformation of exemplary images comparing cage-based deformation techniques, in accordance with the prior art, to conformal cage-based deformation with polynomial curves, in accordance with embodiments of the present disclosure.

With respect to conventional methods for cage-based deformation, an artist must choose between implementing cage-based deformation of an image through a conformal deformation along straight segments (i.e., GC) or an interpolant deformation along cubic curves (i.e., cubic MVC), but not both. Oftentimes, the interpolant deformation along cubic curves does not achieve the desired result as the local aspects of the image are not preserved and the image is unnecessarily distorted. FIGS. 3-5 show examples interpolant deformation along cubic curves. Further, the conformal deformation along straight segments may not achieve the desired result as the artist may desire to deform the image along curved segments. FIG. 5 shows examples of conformal deformation along straight segments. Thus, under conventional methods, if an artist desires to preserve local aspects of an image and deform an image along curved segments using conformal mappings, the artist cannot utilize currently-existing cage-based deformation techniques.

Further, oftentimes conventional methods for cage-based deformation are not optimized for parallel processing on a graphics processing unit ("GPU"). Accordingly, unnecessary computing and network resources are utilized to process the deformation of images under conventional methods for cage-based deformation. For example, the deformation of an image under some conventional methods of cage-based deformation require the formulation of an entirety of an image within a cage as the deformation relies on neighboring portions of the image. As a result, as the number of pixels of an image increase, the calculation to deform the image becomes increasingly complex and the deformation of an image will take a significant amount of time to compute.

As such, embodiments of the present disclosure are directed to conformal cage-based deformation with polynomial curves in an efficient and effective manner. In this regard, images can be efficiently and effectively deformed based on curved segments of a cage model while maintaining conformality of the deformed image, thereby preserving local aspects of the image. Generally, and at a high level, embodiments described herein facilitate the conformal deformation of the parts of an image inside a polygonal cage, as a direct result of deforming each cage segment into a polynomial curve. For example, a cage model is drawn around an image by selecting the vertices of the cage model. Curve control points, which allow the adjustment of the curvature of the segment of the cage model, are generated by converting each segment from a straight segment to a polynomial arc of any degree. The cage model is then deformed by adjusting the curve control points. In response to the deformation of the cage model, the image is then deformed by performing a conformal transformation of each pixel of the image in relation to the deformed cage model. Preprocessed weights (e.g., cage coordinates) for each pixel of the image can be determined merely based on the input (rest-pose) cage vertices and number of curve control points in order to facilitate fast and efficient conformal deformation of the image so that the deformed image can be displayed in real-time or as close to real-time as possible.

In operation, as described herein, an image can be displayed and a cage model can be drawn around the image by selecting vertices of the cage model. The boundary of the cage model is defined by segments between the vertices. Curve control points are generated on each segment by converting the segment from a straight line to a polynomial curve of any degree. The vertices of the segment are curve control points that control the endpoints of the segment/polynomial curve. The curve control points between the endpoints allow the user to adjust the curvature of the segment/polynomial curve.

The user selects and moves the curve control points deforming the boundary of the cage model and the curvature of the boundary of the cage model. The image is then deformed by determining a new location of each pixel of the image based the new locations of the curve control points of the deformed cage model while ensuring conformality of each pixel of the image. The conformal transformation of each pixel of the 2-D image ensures that the local neighborhood of each pixel is only locally rigidly rotated and scaled, thus preserving the local aspects of the image everywhere.

In some embodiments, in preprocessing, after generation of the curve control points and while the cage model is in its original rest pose of straight segments, weights (e.g., cage coordinates) are calculated for each pixel of the image can be determined merely based on the input (rest-pose) cage vertices and number of curve control points. The preprocessed weights are calculated to generate a conformal transformation of each pixel of the image based on movement of the curve control points. In this regard, the deformed image can be displayed in real-time or as close to real-time as possible during deformation of the cage model.

Advantageously, efficiencies of computing resources can be enhanced using implementations described herein. In particular, conformally deforming an image based on a cage model with polynomial curves of any degree allows an artist to use cage-based deformation to deform an image along curves while preserving local aspects of the image. Further, optimizing the algorithm to ensure that the formulation of each pixel is local, in that the formulation does not rely on the formulation of neighboring pixels, allows for parallel processing on a GPU, thereby improving performance so that the deformed image can be displayed in real-time or as close to real-time as possible. For example, as described in further detail below, during processing of each pixel for deformation, the processing of each pixel does not rely on processing of other pixels and merely relies on its computed weights (e.g., $$\phi_m^{(c,\eta)}$$

and $$\psi_m^{(c,\eta)}/\phi[n]$$

and $\psi[n]$) and the new location of the curve control point/change in curvature of the segment allowing for parallel processing on a GPU, thereby improving performance so that the deformed image can be displayed in real-time or as close to real-time as possible. Even further, preprocessing the computationally heavy portions of the algorithm (e.g., preprocessing the computation of $$\phi_m^{(c,\eta)}$$

and $$\psi_m^{(c,\eta)}/\phi[n]$$

and $\psi[n]$, as discussed in further detail below, preprocessing the computation of $$F_n^{(c,\eta)}/F[n]$$

as discussed in further detail below, etc.) provides for a more efficient use of computing resources as the computationally heavy portions of the algorithm do not need to be repeatedly computed, thereby improving processing speed. In this regard, the technology described herein enables a user to be able to efficiently and effectively conformally deform images based on curved segments of a cage model, thereby reducing unnecessary computing resources used to deform images.

Figure 1:
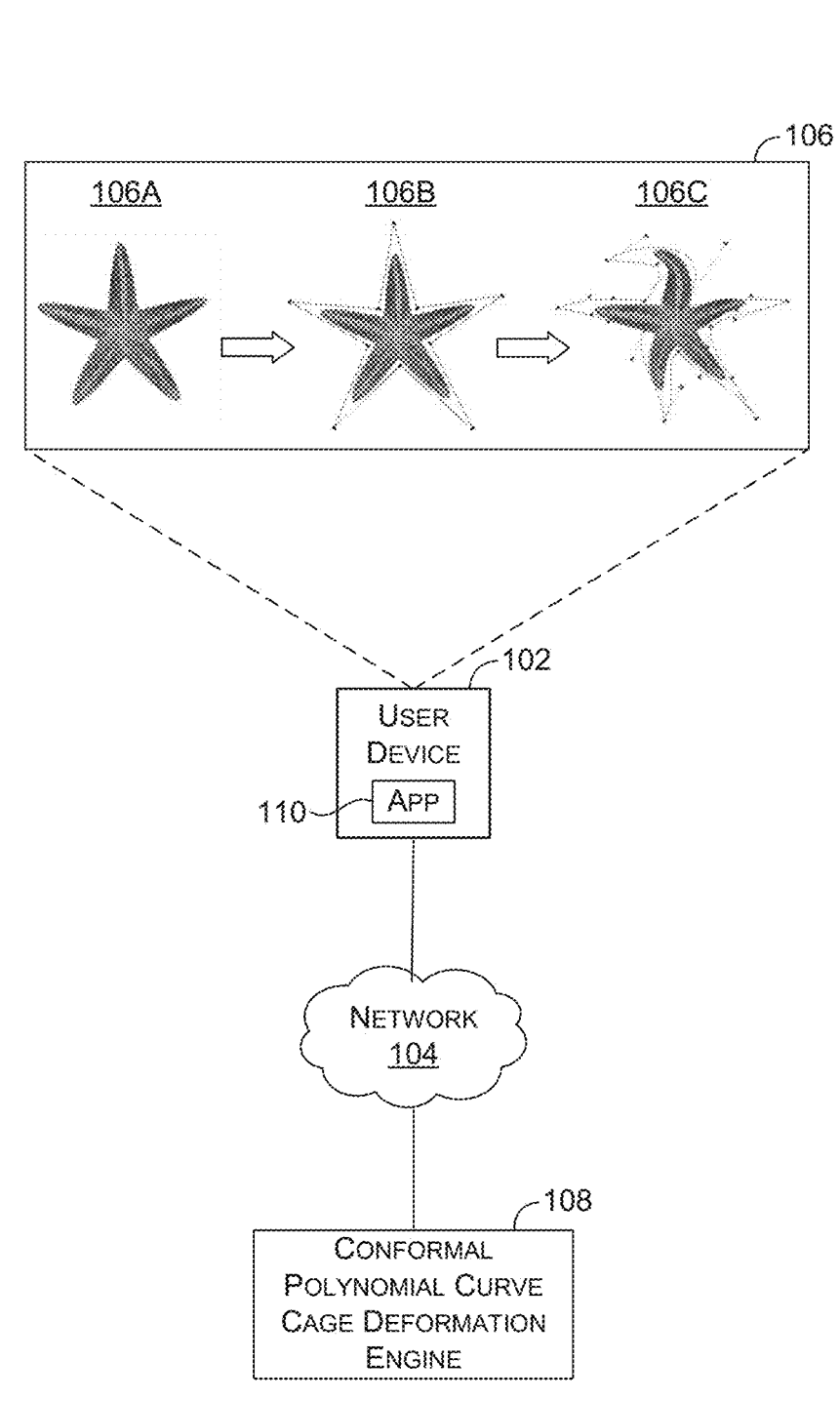
FIG. 1 depicts a diagram of an environment in which one or more embodiments of the present disclosure can be practiced, in accordance with various embodiments of the present disclosure.

Turning to the figures, FIG. 1 depicts an example configuration of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory as further described with reference to FIG. 7.

It should be understood that operating environment 100 shown in FIG. 1 is an example of one suitable operating environment. Among other components not shown, operating environment 100 includes a user device 102, application 110, network 104, and conformal polynomial curve cage deformation engine 108. Operating environment 100 also shows an example conformal cage-based deformation with polynomial curves shown as example 106. Example 106 includes an example input image 106A, an example cage model and image 106B, and an example deformed cage model and image 106C. Each of the components shown in FIG. 1 can be implemented via any type of computing device, such as one or more of computing device 700 described in connection to FIG. 7, for example.

These components can communicate with each other via network 104, which can be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, one or more private networks, one or more cellular networks, one or more peer-to-peer (P2P) networks, one or more mobile networks, or a combination of networks. Where network 104 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 104 is not described in significant detail.

It should be understood that any number of user devices, servers, and other components can be employed within operating environment 100 within the scope of the present disclosure. Each can comprise a single device or multiple devices cooperating in a distributed environment.

User device 102 can be any type of computing device capable of being operated by an individual(s) (e.g., an artist or any user that desires to deform images). For example, in some implementations, such devices are the type of computing device described in relation to FIG. 7. By way of example and not limitation, user devices can be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors, and one or more computer-readable media. The computer-readable media may include computer-readable instructions executable by the one or more processors. The instructions may be embodied by one or more applications, such as application 110 shown in FIG. 1. Application 110 is referred to as single applications for simplicity, but its functionality can be embodied by one or more applications in practice.

Application 110 operating on user device 102 can generally be any application capable of displaying images. In some implementations, the application 110 comprises a web application, which can run in a web browser, and could be hosted at least partially server-side (e.g., via conformal polynomial curve cage deformation engine 108). In addition, or instead, the application 110 can comprise a dedicated application. In some cases, the application 110 is integrated into the operating system (e.g., as a service). As specific example applications, application 110 may be a photo editor website or application, a digital drawing website or application, a digital graphics editor website or application, an animation website or application, or any website or application that is capable of using or displaying images. Such an application may be accessed via a mobile application, a web application, or the like.

User device 102 can be a client device on a client-side of operating environment 100, while conformal polynomial curve cage deformation engine 108 can be on a server-side of operating environment 100. Conformal polynomial curve cage deformation engine 108 may comprise server-side software designed to work in conjunction with client-side software on user device 102 so as to implement any combination of the features and functionalities discussed in the present disclosure. An example of such client-side software is application 110 on user device 102. This division of operating environment 100 is provided to illustrate one example of a suitable environment, and it is noted there is no requirement for each implementation that any combination of user device 102 or conformal polynomial curve cage deformation engine 108 to remain as separate entities.

Application 110 operating on user device 102 can generally be any application capable of facilitating the exchange of information between the user device 102 and the conformal polynomial curve cage deformation engine 108 in displaying and exchanging information regarding images, cage models, and deformation of the cage models and images. In some implementations, the application 110 comprises a web application, which can run in a web browser, and could be hosted at least partially on the server-side of environment 100. In addition, or instead, the application 110 can comprise a dedicated application. In some cases, the application 110 is integrated into the operating system (e.g., as a service). It is therefore contemplated herein that "application" be interpreted broadly.

In accordance with embodiments herein, the application 110 can facilitate conformal cage-based deformation with polynomial curves in an efficient and effective manner. An example conformal cage-based deformation with polynomial curves is shown as example 106. In operation, an image is displayed via a graphical user interface provided via the application 110. For example, example input image 106A shows an image of a starfish. As can be appreciated, the image shown in example input image 106A is made up of a number of pixels. A cage model can be generated for the image. For example, the cage model can be generated around the image by a user selecting vertices of the cage model in the graphical user interface provided by application 110. The selected vertices can be received by conformal polynomial curve cage deformation engine 108 to generate a cage model for display by application 110. In some embodiments, the cage model is drawn around a portion of the image so that only a portion of the image is subsequently deformed. In some embodiments, the cage model is drawn around the entirety of the image. For example, example cage model and image 106B shows the cage model drawn around the entirety of the image.

As can be appreciated from example cage model and image 106B, the boundary of the cage model is defined by segments between the vertices. Conformal polynomial curve cage deformation engine 108 can generate curve control points on each segment by converting the segment from a straight line to a polynomial curve of any degree. Conformal polynomial curve cage deformation engine 108 can then communicate the cage model with the curve control points for display by application 110. The vertices of the segment are curve control points that control the endpoints of the segment/polynomial curve. The curve control points between the endpoints allow the user to adjust the curvature of the segment/polynomial curve. In some embodiments, the curve control points are generated while the polynomial curve is still a straight segment.

The user can select and move any amount of the curve control points in the graphical user interface provided by application 110. Application 110 communicates the new locations of the curve control points to conformal polynomial curve cage deformation engine 108. Conformal polynomial curve cage deformation engine 108 thereby deforms the boundary of the cage model and the curvature of the boundary of the cage model for display through application 110. For example, example deformed cage and image 106C shows the deformed cage model. Conformal polynomial curve cage deformation engine 108 then deforms the image by determining a new location of each pixel of the image based the new locations of the curve control points of the deformed cage model while ensuring conformality of each pixel of the image. The deformed image is then displayed through application 110. As further shown in example deformed cage and image 106C, the image is deformed by performing a conformal transformation of each pixel of the image based on the new locations of the curve control points of the deformed cage. As can be appreciated from example 106, the conformal transformation of each pixel of the image ensures that the local neighborhood of each pixel is only locally rigidly rotated and scaled, thus preserving the local aspects of the image.

In some embodiments, in preprocessing, after generation of the curve control points and while the cage model is in its original rest pose of straight segments, conformal polynomial curve cage deformation engine 108 calculates weights (e.g., cage coordinates) for each pixel of the image based on the locations of the curve control points in their initial locations on the straight segment. The preprocessed weights are calculated to generate a conformal transformation of each pixel of the image based on movement of the curve control points. In this regard, the deformed image can be displayed via application 110 in real-time or as close to real-time as possible during deformation of the cage model.

At a high level, conformal polynomial curve cage deformation engine 108 performs various functionality to facilitate efficient and effective conformal cage-based deformation with polynomial curves. The conformal polynomial curve cage deformation engine 108 can communicate with application 110 in order for application 110 to display the image, cage model, deformed cage model, and deformed image via a display screen of the user device 102.

In this regard, conformal polynomial curve cage deformation engine 108 can receive data regarding the image from application 110 of the user device. Further, conformal polynomial curve cage deformation engine 108 can receive data regarding the vertices of the cage model from application 110 of the user device. Conformal polynomial curve cage deformation engine 108 can generate a cage model including curve control points and communicate data regarding the cage model to application 110 for display in the user device. In some embodiments, prior to the movement of the curve control points, conformal polynomial curve cage deformation engine 108 can preprocess weights (e.g., cage coordinates) for each pixel of the image based on the curve control points of the rest cage model.

Conformal polynomial curve cage deformation engine 108 can receive data from application 110 regarding the new locations of the curve control points. In response to the new locations of the control points, conformal polynomial curve cage deformation engine 108 can deform the cage model by changing curvature of the cage model and communicate data regarding the deformed cage to application 110 for display in the user device. Conformal polynomial curve cage deformation engine 108 can then subsequently deform the image based on the deformed cage model while maintaining conformality of the deformed image and communicate data regarding the deformed image to application 110 for display in the user device.

Conformal polynomial curve cage deformation engine 108 can be or include a server, including one or more processors, and one or more computer-readable media. The computer-readable media includes computer-readable instructions executable by the one or more processors. The instructions can optionally implement one or more components of conformal polynomial curve cage deformation engine 108, described in additional detail below with respect to conformal polynomial curve cage deformation manager 202 of FIG. 2.

For cloud-based implementations, the instructions on conformal polynomial curve cage deformation engine 108 can implement one or more components, and application 110 can be utilized by a user to interface with the functionality implemented on conformal polynomial curve cage deformation engine 108. In some cases, application 110 comprises a web browser. In other cases, conformal polynomial curve cage deformation engine 108 may not be required. For example, the components of conformal polynomial curve cage deformation engine 108 may be implemented completely on a user device, such as user device 102. In this case, conformal polynomial curve cage deformation engine may be embodied at least partially by the instructions corresponding to application 110.

Thus, it should be appreciated that conformal polynomial curve cage deformation engine 108 may be provided via multiple devices arranged in a distributed environment that collectively provide the functionality described herein. Additionally, other components not shown may also be included within the distributed environment. In addition, or instead, conformal polynomial curve cage deformation engine 108 can be integrated, at least partially, into a user device, such as user device 102. Furthermore, conformal polynomial curve cage deformation engine 108 may at least partially be embodied as a cloud computing service.

Figure 2:
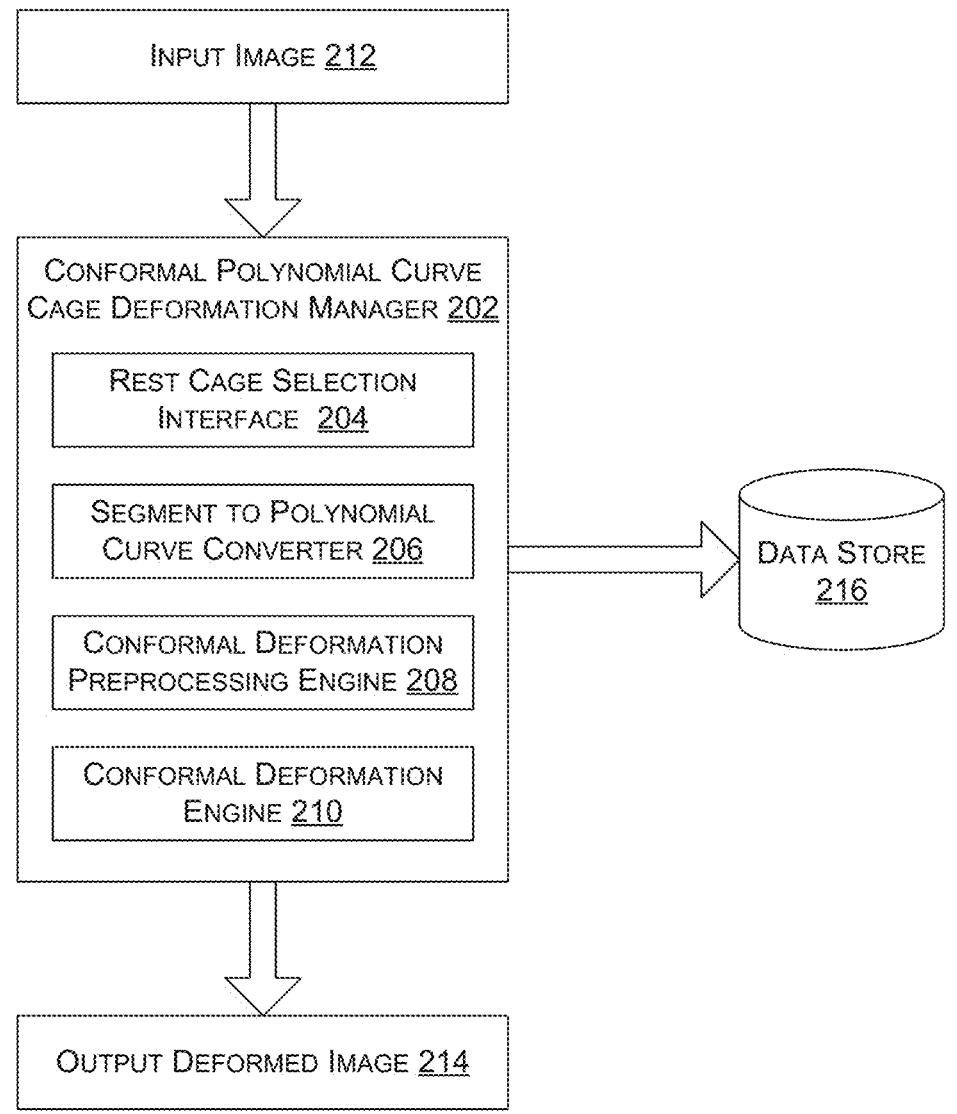
FIG. 2 depicts an example configuration of an operating environment in which some implementations of the present disclosure can be employed, in accordance with various embodiments of the present disclosure.

Referring to FIG. 2, aspects of an illustrative conformal polynomial curve cage deformation management system are shown, in accordance with various embodiments of the present disclosure. At a high level, the conformal polynomial curve cage deformation management system can receive and display an image, generate and display a cage model including curve control points to change the curvature of the cage model, deform and display the cage model by changing curvature of the cage model, deform the image based on the deformed cage model while maintaining conformality of the deformed image, and display the deformed image for presentation. As described herein, embodiments herein provide for a fast and efficient algorithm for conformal deformation of an image based on a cage model with polynomial curves.

As shown in FIG. 2, conformal polynomial curve cage deformation manager 202 includes a rest cage selection interface 204, segment to polynomial curve converter 206, a conformal deformation preprocessing engine 208, and a conformal deformation engine 210. Input image 212 is input into conformal polynomial curve cage deformation manager 202 and conformal polynomial curve cage deformation manager 202 outputs output deformed image 214 for presentation. The conformal polynomial curve cage deformation manager 202 can communicate with the data store 216. The data store 216 is configured to store various types of information accessible by conformal polynomial curve cage deformation manager 202, or other server or component. The foregoing components of conformal polynomial curve cage deformation manager 202 can be implemented, for example, in operating environment 100 of FIG. 1. In particular, those components may be integrated into any suitable combination of user devices 102 and/or conformal polynomial curve cage deformation engine 108.

In embodiments, data sources (such as input image 212 and output deformed image 214), user devices (such as user device 102 of FIG. 1), and conformal polynomial curve cage deformation manager 202 can provide data to the data store 216 for storage, which may be retrieved or referenced by any such component. As such, the data store 216 can store computer instructions (e.g., software program instructions, routines, or services), data and/or models used in embodiments described herein, such as images, cage models, preprocessed weights (e.g., cage coordinates), deformed cage models, deformed images, algorithms for conformal deformation of an image based on a cage model with polynomial curves, and/or the like. In some implementations, data store 216 can store information or data received or generated via the various components of conformal polynomial curve cage deformation manager 202 and provides the various components with access to that information or data, as needed. The information in data store 216 may be distributed in any suitable manner across one or more data stores for storage (which may be hosted externally).

The rest cage selection interface 204 is generally configured to generate a rest cage (i.e., a cage model in its rest pose) for an image. In embodiments, rest cage selection interface 204 can include rules, conditions, associations, models, algorithms, or the like to generate a rest cage for an image. Rest cage selection interface 204 may take on different forms depending on the mechanism used to generate a rest cage for an image. For example, rest cage selection interface 204 may comprise a statistical model, fuzzy logic, neural network, finite state machine, support vector machine, logistic regression, clustering, or machine-learning techniques, similar statistical classification processes, or combinations of these to generate a rest cage for an image.

In some embodiments, rest cage selection interface 204 displays an image and receives vertices to generate a rest cage based on the selected vertices of the rest cage. In this regards, the boundary of the rest cage is made up of segments between each of the vertices. In some embodiments, the cage model is drawn around a portion of the image so that only a portion of the image is subsequently deformed. In some embodiments, the cage model is drawn around the entirety of the image.

The segment to polynomial curve converter 206 is generally configured to convert segments of the rest cage generated by rest cage selection interface 204 into polynomial curves. Segment to polynomial curve converter 206 can include rules, conditions, associations, models, algorithms, or the like to convert segments of the rest cage into polynomial curves. Segment to polynomial curve converter 206 may take on different forms depending on the mechanism used to convert segments of the rest cage into polynomial curves. For example, segment to polynomial curve converter 206 may comprise a statistical model, fuzzy logic, neural network, finite state machine, support vector machine, logistic regression, clustering, or machine-learning techniques, similar statistical classification processes, or combinations of these to convert segments of the rest cage into polynomial curves.

In some embodiments, segment to polynomial curve converter 206 receives as user input the degree of the polynomial curves and generates control points between the vertices of the segment based on the degree of the polynomial curve the user wishes to use for deformation. The vertices of the segment are curve control points that control the endpoints of the segment/polynomial curve. The curve control points between the endpoints allow the user to adjust the curvature of the segment/polynomial curve. In some embodiments, the curve control points are generated while the polynomial curve is still a straight segment.

The conformal deformation preprocessing engine 208 is generally configured to preprocess weights (e.g., cage coordinates) for each pixel of an image within a rest cage based on the locations of the input endpoints of the segments of the cage model and the user-provided degree of their corresponding deformation curves (e.g., a user designates the degree of the polynomial curve where a third-degree polynomial curve would have three curve control points, a fourth-degree polynomial curve would have four curve control points, etc.). The preprocessed weights are calculated to generate a conformal transformation of each pixel of the image based on movement of the curve control points. The conformal deformation preprocessing engine 208 can include rules, conditions, associations, models, algorithms, or the like to preprocess weights for each pixel of an image within the rest cage. The conformal deformation preprocessing engine 208 may take on different forms depending on how the weights for each pixel of an image within the rest cage are preprocessed. For example, the conformal deformation preprocessing engine 208 may comprise a statistical model, fuzzy logic, neural network, finite state machine, support vector machine, logistic regression, clustering, or machine-learning techniques, similar statistical classification processes, or combinations of these to preprocess weights for each pixel of an image within the rest cage.

In some embodiments, in preprocessing, after generation of the curve control points and while the cage model is in its original rest pose of straight segments, conformal polynomial curve cage deformation engine 108 calculates weights (e.g., cage coordinates) for each pixel of the image based on the locations of the curve control points in their initial locations on the straight segment. The preprocessed weights are calculated to generate a conformal transformation of each pixel of the image based on movement of the curve control points. In this regard, the deformed image can be in real-time or as close to real-time as possible during deformation of the cage model.

Embodiments describing how the conformal deformation preprocessing engine 208 is configured to preprocess weights (e.g., cage coordinates) for each pixel of an image are described more fully below.

The conformal deformation engine 210 is generally configured to conformally deform an image based on the deformation the cage model. The conformal deformation engine 210 can include rules, conditions, associations, models, algorithms, or the like to conformally deform an image based on the deformation of the cage model. The conformal deformation engine 210 may take on different forms depending on how the image is deformed. For example, conformal deformation engine 210 may comprise a statistical model, fuzzy logic, neural network, finite state machine, support vector machine, logistic regression, clustering, or machine-learning techniques, similar statistical classification processes, or combinations of these to conformally deform an image based on the deformation of the cage model.

In some embodiments, the user selects and moves the curve control points deforming the boundary of the cage model and the curvature of the boundary of the cage model. The image is then deformed by determining a new location of each pixel of the image based the new locations of the curve control points of the deformed cage model and the preprocessed weights while ensuring conformality of each pixel of the image. The conformal transformation of each pixel of the image ensures that local aspects of the image are preserved during deformation of the image. Further, as conformal deformation engine 210 only relies on the preprocessed weights and new locations of the curve control points, conformal deformation engine 210 and the deformed image (e.g., output deformed image 214) can be in an interaction loop as the deformation of the image can be computed at an interactive rate allowing the deformation of the image in real-time or as close to real-time as possible. For example, as the user moves a curve control point, the image can be deformed in real-time (or as close to real-time as possible) as the user moves the control point.

Embodiments describing how the conformal deformation engine 210 is configured to conformally deform an image based on the deformation of curves of a cage model are described more fully below.

Conventional Green Coordinates

Using Green's third identity, a harmonic function $f$ in a compact 2D domain 22 from its boundary conditions as:

$$f(\eta) = \underbrace{\int_{\xi \in \partial\Omega} f(\xi) \frac{\partial G}{\partial n_\xi}(\xi, \eta) d\xi}_{:=f_D(\eta)} + \underbrace{\int_{\xi \in \partial\Omega} -G(\xi, \eta) \frac{\partial F}{\partial n_\xi}(\xi) d\xi}_{:=f_N(\eta)}, \quad (1)$$

with $$G(\xi, \eta) := \frac{1}{2\pi} \log(\|\xi - \eta\|)$$

solution to $\Delta_1 G(\xi,\eta) = \Delta_2 G(\xi, \eta) = \delta(\|\xi-\eta\|)$ and n the unit normal of the cage at point $\xi$. The term $\eta$ refers to a point or pixel location of the image. For example, an image or object can be a made up of any number of points or pixels.

The term $f_D(n)$ (resp. $f_N(\eta)$) corresponds to the contribution given by the diffusion of the Dirichlet (resp. Neumann) boundary condition. The cage $\partial\Omega$ is a non-intersecting closed polygon made of vertices $v_i \in V$ connected by edges $e_j \in \epsilon$ (oriented Counter-Clock-Wise ("CCW") by convention). Deformed quantities are noted with a bar (·) and rest-pose quantities without a bar. In conventional GC, the following Dirichlet and Neumann conditions are used:

$$f(\xi) = \sum_i \Gamma^i(\xi) \bar{v}_i \quad (2)$$

$$\frac{\partial f}{\partial n_\xi}(\xi) = \sigma_j \bar{n}_j \forall \xi \in e_j, \quad (3)$$

where $\Gamma^i$ is the "hat basis function" that takes value 1 on vertex i, 0 at the other vertices and is linear on each edge, and $\sigma_j$ and $\bar{n}_j$ are respectively the stretch factor and the normal of the linearly-deformed edge $e_j$. Both quantities are constant across $e_j$ as they depend on the (constant) edge linear map only. Injecting these boundary conditions in Eq. 1 results in the following compact expression for $f$:

$$\bar{n} := f(\eta) = \sum_{i \in V} \phi_i(\eta) \bar{v}_i + \sum_{j \in \epsilon} \psi_j(\eta) \sigma_j n_j, \text{ with} \quad (4)$$

$$\phi_i(\eta) := \int_{\xi \in F_1(i)} \Gamma^i(\xi) \frac{\partial G}{\partial n_\xi}(\xi, \eta) d\xi \quad (5)$$

$$\psi_j(\eta) := \int_{\xi \in e_j} -G(\xi, \eta) d\xi \quad (6)$$

Conventional GC is proven to produce conformal deformations by the following lemma: LEMMA 1. Assuming a deformation function given by Eq. (4), setting the stretch factor $\sigma_j$ for edge j as the deformed-edge-length by rest-edge-length ratio:

$$\sigma_j = \frac{\|\bar{e}_j\|}{\|e_j\|} \quad (7)$$

results in conformal deformations (i.e., the Jacobian of the deformation is a rotation matrix multiplied by a stretch factor everywhere).

Exemplary Solution for Conformal Cage-Based Deformation with Polynomial Curves

Embodiments herein describe an improvement to conventional GC by providing a formulation for GC for cages made of non-intersecting curves $\{c_i\}_i$ that form the boundary $\partial\Omega$ (oriented CCW) of a compact domain $\Omega$. In this context, Eq. (1) still holds, and, for the sake of simplicity, the analysis provided is focused on the contribution of a single curve c: $[0,1] \mapsto \mathbb{R}^2$ (where $\bar{c}$ is the deformed curve). However, as can be appreciated, the analysis can be applied to the contribution of any amount curves. The equation $$f_D^c(\eta) := \int_{\xi \in c} f(\xi) \frac{\partial G}{\partial n_\xi}(\xi, \eta) d\xi \qquad 5$$

contributes to the Dirichlet term and the equation $$f_N^c(\eta) := \int_{\xi \in c} -G(\xi, \eta) \frac{\partial f}{\partial n_\xi}(\xi) d\xi$$

contributes to the Neumann term.

The following is the general case where the rest curve c and deformed curve č can be any $C^1$ arc. Following the general case, the closed-form expressions for simple families of curves are presented. Dirichlet term. The Dirichlet term can be rewritten as:

$$f_D^c(\eta) = \int_{t=0}^{1} \bar{c}(t) \nabla_1 G(c(t), \eta) \cdot n_{c(t)} \|c'(t)\| dt,$$

$$c'(t)td\xi = \|c'(t)\|dt\xi =$$

$$c(t)cn_{c(t)} \|c'(t)\| = c'(t)^\perp(a, b)^\perp = (b, -a) \nabla_1 G(\xi, \eta) = \frac{\xi - \eta}{2\pi \|\xi - \eta\|^2}$$

where the natural parameterization of the curve is introduced in the integral (noting the speed vector at, the infinitesimal linear element is given by for $$c'(t)td\xi = \|c'(t)\|dt\xi =$$

$$c(t)cn_{c(t)} \|c'(t)\| = c'(t)^\perp(a, b)^\perp = (b, -a) \nabla_1 G(\xi, \eta) = \frac{\xi - \eta}{2\pi \|\xi - \eta\|^2}).$$

Since the curve is oriented CCW, where. Noting that, the following is obtained:

$$f_D^c(\eta) \int_{t=0}^{1} \bar{c}(t) \frac{(c(t) - \eta) \cdot c'(t)^\perp}{2\pi \|c(t) - \eta\|^2} dt. \qquad (8)$$

Neumann term. Introducing the conformality condition of Lemma 1 leads to the following reformulation of the Neumann term:

$$f_N^c(\eta) = \int_{t=0}^{1} -G(c(t), \eta) \frac{\overline{c'(t)}^\perp}{\|\overline{c'(t)}^\perp\|} \frac{\|\overline{c'(t)}\|}{\|c'(t)\|} \frac{d\xi}{\|c'(t)\|dt} \qquad (9)$$

$$= \int_{t=0}^{1} \frac{-1}{2\pi} \log(\|c(t) - \eta\|) \overline{c'}(t)^\perp dt$$

To understand why this is the right formulation for the Neumann term incorporating the conformality condition of Lemma 1, one can discretize the curve c into a polyline ĉ(ĉ:[0,1]) ↦ $\mathbb{R}^2$, with ĉ($t_k$)=$c_k$, ĉ affine on the segment [$t_k$, $t_{k+1}$], with $t_k$=k/N, and notice that Lemma 1 implies then:

$$f_N^{\hat{c}}(\eta) = \int_{\xi \in \hat{c}} -G(\xi, \eta) \frac{\partial f}{\partial n_\xi}(\xi) d\xi = \sum_{k=0}^{N-1} \int_{\xi \in [c_k, c_{k+1}]} -G(\xi, \eta) \frac{\partial f}{\partial n_\xi}(\xi) d\xi \qquad (10)$$

$$= \sum_{k=0}^{N-1} \left( \int_{\xi \in [c_k, c_{k+1}]} -G(\xi, \eta) d\xi \right) \sigma_k \bar{n}_k (\text{Conventional } GC)$$

$$= \sum_{k=0}^{N-1} \left( \int_{t=t_k}^{t_{k+1}} -G(\hat{c}(t), \eta) \|\hat{c}'(t)\| dt \right) \frac{(\bar{c}_{k+1} - \bar{c}_k)^\perp}{\|\bar{c}_{k+1} - \bar{c}_k\|} \frac{\|\bar{c}_{k+1} - \bar{c}_k\|}{\|c_{k+1} - c_k\|}$$

$$= \sum_{k=0}^{N-1} \int_{t=t_k}^{t_{k+1}} -G(\hat{c}(t), \eta) \frac{(\bar{c}_{k+1} - \bar{c}_k)^\perp}{\|\bar{c}_{k+1} - \bar{c}_k\|} \frac{\|\bar{c}_{k+1} - \bar{c}_k\|}{\|c_{k+1} - c_k\|} \|\hat{c}'(t)\| dt$$

where $\psi_k(\eta)$ is the usual Green coordinate of $\eta$ associated with an improved definition of the segment $$[c_k, c_{k+1}], \bar{n}_k := \frac{(\bar{c}_{k+1} - \bar{c}_k)^\perp}{\|\bar{c}_{k+1} - \bar{c}_k\|}$$

is the unit normal on that segment, and $$\sigma_k := \frac{\|\bar{c}_{k+1} - \bar{c}_k\|}{\|c_{k+1} - c_k\|}$$

is an improved definition of the deformed length over initial length ratio from conventional GC, resulting in conformal deformations for any such polygonal approximation of the curve c. Finally, taking the limit N→∞ results in Eq. (9) (simply by definition of the Riemann integral), ending the proof.

The closed-form expressions for a simple family of curves is presented as follows: straight regular segments at encoding (i.e., $$c(t) = \sum_{k=0}^{1} t^k c_k)$$

being deformed into Bezier curves of degree $N_c$ (i.e., $$\bar{c}(t) = \sum_{m=0}^{N_c} t^m \bar{c}_m).$$

For example, for a straight line or curve, the line/curve can be expressed as a function of point c(0) through c(1) of the curve (e.g., c(0.5) would be halfway point of the curve/arc). c(t) corresponds to the rest pose of the curve. In this regard, c(t) corresponds to the curve/segment while the curve/segments is in its rest state as a straight line (i.e., the curve is to degree 1). $\bar{c}(t)$ corresponds to the deformed curve to arbitrary degree $N_c$.

The Dirichlet term can be rewritten as the integral of a rational fraction:

$$f_{\mathcal{D}}^c(\eta) = \int_{t=0}^{1} \overline{c}(t) \frac{(c(t) - \eta) \cdot c'(t)^{\perp}}{2\pi \|c(t) - \eta\|^2} dt \qquad (11)$$

$$= \int_{t=0}^{1} \sum_{m=0}^{N_c} t^m \overline{c}_m \frac{(c_0 - \eta + tc_1) \cdot c_1^{\perp}}{2\pi \|c(t) - \eta\|^2} dt$$

$$= \sum_{m=0}^{N_c} \underbrace{\left( F_m^{(c,\eta)}(c_0 - \eta) \cdot c_1^{\perp} \right)}_{:=\phi_m^{(c,\eta)}} \overline{c}_m,$$

where F is defined as:

$$F_n^{(c,\eta)} := \int_{t=0}^{1} \frac{t^n}{2\pi \left\| \eta - \sum_{i=0}^{1} t^i c_i \right\|^2} dt \qquad (12)$$

Equations 11 and 12 provide a solution for the Dirchlet term for a deformed curve of arbitrary degree $$N_c. \; \phi_m^{(c,\eta)}$$

is defined as function of point $\eta$ of an image within a boundary of a cage model with respect to curve c. In $$F_n^{(c,\eta)}$$

within $$\phi_m^{(c,\eta)}, \; c_i$$

refers to control points of the rest pose of the curve (e.g., while the segment is a straight line), which can be referred to as the curve control points for the segments/curves of the boundary of the cage. In embodiments, $$\phi_m^{(c,\eta)}$$

(and $$\psi_m^{(c,\eta)}$$

discussed in further detail below) are the preprocessed weights (e.g., the cage coordinates).

$$\phi_m^{(c,\eta)}$$

(and $$\psi_m^{(c,\eta)})$$

relies on the initial locations of the curve control points and can be computed initially in order to compute weights (e.g., cage coordinates) for each point/pixel of the image within the boundary.

$$\phi_m^{(c,\eta)}$$

(and $$\psi_m^{(c,\eta)})$$

can be computed initially in preprocessing and separate from the rest of the Dirichlet term as $$\phi_m^{(c,\eta)}$$

(and $$\psi_m^{(c,\eta)})$$

are the computationally heavy portion of the conformal transformation. Further, $$F_n^{(c,\eta)}$$

(which is within $$\phi_m^{(c,\eta)})$$

can be computed initially during the computation of $$\phi_m^{(c,\eta)}$$

(and $$\psi_m^{(c,\eta)})$$

in order to limit the number of times that $$F_n^{(c,\eta)}$$

must be computed as $$F_n^{(c,\eta)}$$

is the computationally heavy portion of computing $$\phi_m^{(c,\eta)}$$

(and $$\psi_m^{(c,\eta)}).$$

A closed-form expression of $$F_n^{(c,\eta)}$$

is given at Equation (15). After computing $$\phi_m^{(c,\eta)}$$

(and similarly for $$\psi_m^{(c,\eta)}),$$

the remaining computation of the Dirichlet term is based on the new location curve control points/curve.

The Neumann term can be rewritten as $$f_N^c(\eta) = \frac{-1}{2\pi} \int_{2=0}^{1} \log(\|c(t) - \eta\|)\overline{c}'(t)^{\perp} dt \qquad (13)$$

$$= \frac{-1}{2\pi} [\log(\|c(t) - \eta\|)\overline{c}(t)^{\perp}]_{t=0}^{1} + \int_{t=0}^{1} \frac{(c(t) - \eta) \cdot c'(t)}{2\pi\|c(t) - \eta\|^2}\overline{c}(t)^{\perp} dt$$

$$= \frac{-1}{2\pi} [\log(\|c(t) - \eta\|)\overline{c}(t)^{\perp}]_{t=0}^{1} + \int_{t=0}^{1} \frac{(c_0 - \eta) \cdot c_1 + t\|c_1\|^2}{2\pi\|c(t) - \eta\|^2}\overline{c}(t)^{\perp} dt$$

$$= \sum_{m=1}^{N_c} \underbrace{\left( F_m^{(c,\eta)}(c_0 - \eta) \cdot c_1 + F_{m+1}^{(c,\eta)}\|c_1\|^2 - \frac{\log\|c_0 + c_1 - \eta\|}{2\pi} \right)}_{:=\psi_m^{(c,\eta)}}\overline{c}_m^{\perp}$$

Note that $$\psi_0^{(c,\eta)} = 0,$$

which is trivial to see beforehand since $\overline{c}_0$ does not appear in the expression of $\overline{c}'(t)$ (see first line of Eq. (13)). As similarly described regarding $$\phi_m^{(c,\eta)} \text{ and } F_n^{(c,\eta)}$$

for the Dirichlet term, $$\psi_m^{(c,\eta)}$$

can be computed during preprocessing for similar reasons. Thus, after the curve control points are generated for the cage model, the weights (e.g., cage coordinates) for all points $\eta$ of the image can be calculated and stored in order to speed up processing and deformation of the image. In this regard, the deformed image can be displayed in real-time or as close to real-time as possible during deformation of the cage model.

The final contribution of curve c (with deformed value $\overline{c}$) to the deformation of $\eta$ is:

$$f_D^{\overline{c}}(\eta) + f_N^{\overline{c}}(\eta) = \sum_{j=0}^{N_c} \phi_j^{(c,\eta)}\overline{c}_j + \sum_{m=1}^{N_c} \psi_m^{(c,\eta)}\overline{c}_m^{\perp}$$

Considering the whole contour $\partial\Omega$, the following is obtained:

$$\overline{\eta} = f(\eta) = \sum_{c \in \partial\Omega} \sum_{n=0}^{N_c} \left( \phi_n^{(c,\eta)}\overline{c}_n + \psi_n^{(c,\eta)}\overline{c}_n^{\perp} \right) \qquad (14)$$

As described above, in some embodiments, the weights (e.g., cage coordinates) from the Dirichlet term $$\phi_m^{(c,\eta)}$$

and the weights (e.g., cage coordinates) from the Neumann term $$\psi_m^{(c,\eta)}$$

are computed for each pixel in the image in preprocessing merely based on the input (rest-pose) cage vertices and number of curve control points for the whole cage model of boundary $\partial\Omega$. Following deformation of the cage model, the scalar weights $$\phi_m^{(c,\eta)}$$

and $$\psi_n^{(c,\eta)}$$

(e.g., cage coordinates) calculated during preprocessing can be utilized along with the new location for control points of the curve $\overline{c}_n$ and the normal of the new location of the control points of the curve $$\overline{c}_n^{\perp}$$

to determine the new location for each point $\overline{\eta}$ of the deformed image. Similarly, for subsequent deformations, the weights (e.g., cage coordinates) calculated during prepro cessing can be utilized and only the new locations of the control points of the curve $\bar{c}_n$ and $$\bar{c}_n^{\perp}$$

are needed to determine the new locations for each point $\bar{\eta}$ for subsequent deformations of the image.

Thus, Equation 14 presents a formula to deform an arbitrary point $\eta$ that is located inside the cage, given the rest pose cage made of input rest-pose segments c, and a deformed cage made of Bezier curves $\bar{c}$ of arbitrary degree. The formula takes the form of a linear combination of the deformed curves parameters. $\bar{c}_j$ is the j-th parameter (e.g., curve control point) of the deformed curve $\bar{c}$ and $$\bar{c}_m^{\perp}$$

is the m-th parameter rotated by 90 degrees.

$$\phi_j^{(c,\eta)}$$

is a scalar weight (e.g., cage coordinates) and is computed only once for each curve and each point $\eta$, that describes the influence of $\bar{c}_j$ onto the output deformed position $$\bar{\eta} \cdot \psi_m^{(c,\eta)}$$

is a scalar weight (e.g., cage coordinates) that is computed only once for each curve and each point $\eta$, that describes the influence of $$\bar{c}_m^{\perp}$$

onto the output deformed position $\bar{\eta}$. The formula requires summing all contributions for all input curves c, that together form the input cage $\partial\Omega$ (i.e., $c \in \partial\Omega$). This formula tells how a single point/pixel $\eta$ can be deformed to $\bar{\eta}$. By applying it onto all inputs pixels/points of the input image within the boundary of the cage model, the entire image within the boundary of the cage model can be deformed.

In practice, the quantities $$\phi_j^{(c,\eta)}$$

and $$\psi_m^{(c,\eta)}$$

can take a few seconds to compute for the whole image. However, $$\phi_j^{(c,\eta)}$$

and $$\psi_m^{(c,\eta)}$$

are computed once, for all pixels/points of the input image, when the input image and the input rest-pose cage are loaded (e.g., in preprocessing). Afterwards, when the user deforms the cage using deformed curves $\bar{c}_n$, Equation 14 can be applied to compute the deformed image points/pixels extremely quickly (typically, real-time on large images for complex cages), because it is a simple linear combination.

The following is the closed-form expression for $$F_n^{(c,\eta)}$$

$$F_n^{(c,\eta)} = \frac{\mathrm{Im}(\omega^n D(\omega) + U_n(\omega))}{2\pi \|c_1\|^2 \mathrm{Im}(\omega)} \qquad (15)$$

$$\text{with } D(\omega) := \mathrm{Log}(1-\omega) - \mathrm{Log}(0-\omega) \qquad (16)$$

$$\text{and } U_n(\omega) := \sum_{k=1}^{n-1} \frac{\omega^k}{n-k} \qquad (17)$$

where $\omega$ is any of the complex roots of the second order polynomial $$\left\| \eta - \sum_{i=0}^{1} t^i c_i \right\|^2$$

and Log is the complex logarithm. Note that $\omega$ is the local coordinates of $\eta$ in the frame relative to the edge (or its conjugate):

$$\omega = \frac{c_1 + i c_1^{\perp}}{\|c_1\|^2} \cdot (\eta - c_0) \qquad (18)$$

The following proves Eq. 15. The denominator of the integrand is a real polynomial of degree 2 so it can be decomposed into a product of complex monomials:

$$F_n^{(c,\eta)} = \int_{t=0}^{1} \frac{t^n}{P(t)} dt, \text{ with } P(x) =: A \prod_{k=1}^{2} (x - \omega_k),$$

where $A = 2\pi \|c_1\|^2$ is a normalization factor. Since $P(t)$ is always positive (it is originally a squared norm), its roots are pair-wise conjugate of each others:

$$\omega_2 = \omega_1^*.$$

The following is noted $$Q_k = \frac{P(x)}{x - \omega_k}$$

the polynomial P without its k-th monomial, so that the following can be written (assuming that x equals none of the $\omega_k$):

$$\sum_{k=1}^{2}\frac{x^n}{x-\omega_k}=\frac{x^n}{P(x)}\sum_{k=1}^{2}Q_k(x)$$

The following is written: $Q=\Sigma_k Q_k$ and since this sum of polynomials has degree 1, the following can also be written:

$$Q(x)=\sum_{j=0}^{1}q_j x^j$$

where $q_j\in\mathbb{C}$:

$$\sum_{k=1}^{2}\frac{x^n}{x-\omega_k}=\sum_{j=0}^{1}qj\frac{x^{n+j}}{P(x)}\qquad(19)$$

The following lemma is then used: LEMMA 2. Let $\omega\in\mathbb{C}$ and $$g_n^{(\omega)}:x\mapsto\frac{x^n}{x-\omega}.$$

A primitive of $$g_n^{(\omega)}$$

for x such that $x-\omega\notin\mathbb{R}^-$ is $$G_n^{(\omega)}:x\mapsto\omega^n\log(x-\omega)+\sum_{l=1}^{n}\frac{x^l}{l}\omega^{n-l}.$$

PROOF. If $x-\omega\notin\mathbb{R}^-$, then $$G_n^{(\omega)\prime}(x)=\frac{\omega^n}{x-\omega}+\sum_{l=1}^{n}x^{l-1}\omega^{n-l}$$

$$=\frac{\omega^n}{x-\omega}+\sum_{l=1}^{n}\frac{x^{l-1}\omega^{n-l}(x-\omega)}{x-\omega}$$

$$=\frac{\omega^n}{x-\omega}+\sum_{l=1}^{n}\frac{x^l\omega^{n-l}}{x-\omega}-\sum_{l'=0}^{n-1}\frac{x^{l'}\omega^{n-l'}}{x-\omega}$$

$$=\frac{x^n}{x-\omega}=g_n^{(\omega)}(x)$$

Since $\eta$ is strictly inside the cage, none of the $\omega_k$ belongs to the range $(0,1)$. Hence this lemma can be applied to integrate Eq. 19:

$$\left[\sum_{k=1}^{2}\omega_k^n\log(x-\omega_k)+\sum_{k=1}^{2}\sum_{l=1}^{n}\frac{x^l}{l}\omega_k^{n-1}\right]_{x=0}^{1}=\sum_{j=0}^{1}q_j F_{n+j}^{(c,\eta)}$$

It is noted that, $\forall x\in\mathbb{R}$:

$$\omega_2^n\log(x-\omega_2)=(\omega_1^*)^n\log(x-\omega_1^*)$$

$$=(\omega_1^n\log(x-\omega_1))^*.$$

Since $\forall_z\in\mathbb{C}$, $z+z^*=2\text{Re}(z)$, the previous equation becomes:

$$2\text{Re}\left(\omega_1^n D(\omega_1)+\sum_{l=1}^{n}\frac{\omega_1^{n-l}}{l}\right)=\sum_{j=0}^{1}g_j F_{n+j}^{(c,\eta)}$$

where it is noted that $D(\omega)=\log(1-\omega)-\log(0-\omega)$. With the notation $\omega_1=\omega$ and $\omega_2=\omega^*$, the following is determined:

$$P(x)=A(x-\omega)(x-\omega^*)$$

$$Q(x)=2A(x-\text{Re}(\omega))$$

It follows that:

$$\frac{1}{A}\text{Re}\left(\omega^n D(\omega)+\sum_{l=1}^{n}\frac{\omega^{n-l}}{l}\right)=F_{n+1}^{(c,\eta)}-\text{Re}(\omega)F_n^{(c,\eta)}.$$

It is noted that $V_n(\omega)=\omega^n D(\omega)+U_n(\omega)$, and thus derive the following recurrence relation:

$$F_{n+1}^{(c,\eta)}=\text{Re}(\omega)F_n^{(c,\eta)}+\frac{1}{A}\text{Re}\left(V_n(\omega)+\frac{1}{n}\right)\qquad(20)$$

with the convention that $$\frac{1}{n}=0$$

if n=0 to alleviate notations. Note that in the implementation the following is used $W_n=V_n+1/n$ to get a nicer recurrent relation. If $$F_n^{(c,\eta)}=\frac{\text{Im}(V_n(\omega))}{A\text{Im}(\omega)}$$

is assumed recursively, the following is found:

$$A\text{Im}(\omega)F_{n+1}^{(c,\eta)}=\text{Re}(\omega)\text{Im}(V_n(\omega))+\text{Im}(\omega)\text{Re}(V_n(\omega))+\frac{\text{Im}(\omega)}{n}$$

$$=\text{Im}(\omega V_n(\omega))+\text{Im}\left(\frac{\omega}{n}\right)$$

$$=\text{Im}\left(\sum_{k=1}^{n-1}\frac{\omega^{n+1-k}}{k}+\frac{\omega}{n}\right)$$

$$=\text{Im}(V_{n+1}(\omega))$$

Thus, the following is found:

$$F_{n+1}^{(c,\eta)} = \frac{\mathrm{Im}(V_{n+1}(\omega))}{A\mathrm{Im}(\omega)}.$$

And it is verified that $$F_0 = \frac{\mathrm{Im}(V_0(\omega))}{A\mathrm{Im}(\omega)} = \frac{\mathrm{Im}(D(\omega))}{A\mathrm{Im}(\omega)},$$

which ends the proof.

Exemplary Implementation of Conformal Cage-Based Deformation with Polynomial Curves An example for the encoding procedure is provided for straight rest edges in Alg. 1. The relation of Eq. (20) is used to recursively compute the terms $$F_n^{(c,\eta)}$$

up to n=N+1:

$$W_0 = D(\omega) \qquad ; \quad F_0 = \frac{\mathrm{Im}(BW_0)}{\mathrm{Im}(\omega)}$$

$$W_{n+1} = \omega W_n + \frac{1}{n+1} \quad ; \quad F_{n+1} = \mathrm{Re}(\omega F_n + BW_n),$$

where $$B = \frac{1}{2\pi\|c_1\|^2} \in \mathbb{R}.$$

The following expression is used for $D(\omega)$:

$$D(\omega) = \frac{1}{2}\log\left(1 + \frac{1 - 2\mathrm{Re}(\omega)}{\|\omega\|^2}\right) + i\ \mathrm{atan2}\left(\mathrm{Im}(\omega); \|\omega\|^2\mathrm{Re}(\omega)\right) \qquad (21)$$

Numerical Stability.

$D(\bullet)$ is well defined for $\eta \notin c$: The $\log(\bullet)$ is ill-defined only for $\|\omega\|^2 = 0$ or $1 - 2\mathrm{Re}(\omega) \leq -\|w\|^2$, which is equivalent to $\omega = 0$ or $\omega = 1$ (i.e., for $\eta$ on the extremities of c). The $\arctan(\bullet)$ is well defined for $\omega \neq 0$ or $\omega \neq 1$ as well. Similarly, $F_0$ is well defined as long as $\mathrm{Im}(\omega) \neq 0$ (i.e., $\eta$ not on the line directed by c). For $\mathrm{Im}(\omega) = 0$, the imaginary part of $D(\omega)$ is equivalent to $\mathrm{Im}(\omega)/(\|\omega\|^2 - \mathrm{Re}(\omega))$ in this case (since $\tan(x) \approx x$ for $x \approx 0$), and therefore the special case is obtained for $F_0$: $F_0 = B/(\|\omega\|^2 - \mathrm{Re}(\omega))$ when $\mathrm{Im}(\omega) = 0$, which is again valid as long as a $\omega \neq 0$ and a $\omega \neq 1$ (i.e., for $\eta$ on the extremities of c).

Thus, embodiments for conformal cage-based deformation with polynomial curve being based on the integral convolutions of monomials (as opposed to, say, a Bézier basis), the artist (or any user) can precompute the weights (e.g., cage coordinates) up to a given degree of a curve N, and still choose at run-time to change the degree $k \leq N$ of the editing curves without re-computation of the weights (e.g., cage coordinates). Indeed, computing the deformation simply requires decomposing the polynomial curves (for example, Bézier curves) onto the usual monomials basis, which can be done per-curve once at every frame without hindering performances.

---

ALGORITHM 1: Encoding of a rest position $\eta$ into cage coordinates. The algorithm can be implemented for each CCW-oriented edge c of the rest cage. N is the degree of the deformed curve $\bar{c}$.

---

Data: A point $\eta$ from inside the rest cage and a directed edge c of the rest cage represented by its vertices $v_0$ and $v_1$.
Result: The arrays $\phi$ and $\psi$ holding the coordinates $\phi^{(c,\eta)}{}_n$ and $\psi^{(c,\eta)}{}_n$ of the point $\eta$ with respect to c.

$x \leftarrow \dfrac{\eta - v_0}{\|\eta - v_0\|} \cdot \dfrac{v_1 - v_0}{\|v_1 - v_0\|}; y \leftarrow \sqrt{1 - x^2}; \omega \leftarrow \dfrac{\|\eta - v_0\|}{\|v_1 - v_0\|}(x + iy);$    // see Eq. (21)

$B \leftarrow \dfrac{1}{2\pi\|v_1 - v_0\|^2};$ $W \leftarrow D(\omega);$ $F \leftarrow |\mathrm{Im}(\omega)| < \epsilon ? \dfrac{B}{\|\omega\|^2 - \mathrm{Re}(\omega)}; \dfrac{B\mathrm{Im}(W)}{\mathrm{Im}(\omega)};$ for n ← 0 to N + 1 do
 | F[n] ← F;
 | F ← Re(ω)F + BRe(W);
 |
 | $W \leftarrow \omega W + \dfrac{1}{n+1};$
end
$\alpha \leftarrow -(\eta - v_0) \cdot (v_1 - v_0)^{\perp}; \beta \leftarrow -(\eta - v_0) \cdot (v_1 - v_0);$ $\gamma \leftarrow \|v_1 - v_0\|^2; \delta \leftarrow -\dfrac{1}{2\pi}\log(\|v_1 - \eta\|);$ for n ← 0 to N do
 | $\phi[n] \leftarrow \alpha F[n];$
 | $\psi[n] \leftarrow \beta F[n] + \gamma F[n+1] + \delta;$
end
$\psi[0] \leftarrow 0;$ -continued ALGORITHM 1: Encoding of a rest position η into cage coordinates. The algorithm can
be implemented for each CCW-oriented edge c of the rest cage. N is the degree
of the deformed curve c̄.

Algorithm 1 provides φ[n] and ψ[n] as output arrays for each point of the image η within the boundary of the cage model for each edge/segment (converted into curve c) of the rest cage. The output arrays are based on the number of curve control points of the curve. φ[n] and ψ[n] relate to the influence of the nth control point of the deformed curve for each point of the image η within the boundary of the of the cage model. In this regard, the new position of the pixel of the image can be calculated based on the deformation of the cage from its rest post and the φ[n] and ψ[n] coefficients or weights (e.g., cage coordinates). As described above, the φ[n] and ψ[n] are the computationally heavy portions of the conformal transformation and can be computed during pre-processing. Further, during preprocessing of φ[n] and ψ[n], the computation of F[n] is the computationally heavy portion of computing φ[n] and ψ[n]. Thus, Algorithm 1 isolates F[n] in order to compute F[n] separately during preprocessing in order to compute F[n] the least amount of times possible. As described above, φ[n] and ψ[n] do not change as φ[n] and ψ[n] are based on the relationship of each point of the image η within the boundary of the cage model to the rest cage, not the deformed cage. Any time the cage model is deformed, the new location of each point of the image can be computed based on the new locations of the curve control points from the rest cage and φ[n] and ψ[n] (e.g., using Equation 14). In this regard, Algorithm 1 can be utilized to compute φ[n] and ψ[n] for each pixel/point while ensuring that the formulation of each pixel is local, in that the formulation does not rely on the formulation of neighboring pixels (e.g., during processing of each pixel for deformation, the processing of each pixel does not rely on processing of other pixels and merely relies on its computed weight (e.g., $$\phi_m^{(c,\eta)}$$

and $$\psi_m^{(c,\eta)}/\phi[n]$$

and ψ[n] and the new location of the curve control point/change in curvature of the segment), which allows for parallel processing on a GPU, thereby improving performance so that the deformed image can be displayed in real-time or as close to real-time as possible during deformation of the cage model.

FIG. 3 provides an example diagram of cage-based deformation of an exemplary image comparing interpolant cage-based deformation, in accordance with the prior art, to conformal cage-based deformation with polynomial curves, specifically polynomial curves of the third-degree (e.g., cubic Bézier curves), in accordance with embodiments of the present disclosure. Diagram 302 provides an example of an interpolant cage-based deformation of an exemplary image. Diagram 312 provides an example of a conformal cage-based deformation with polynomial curves of the exemplary image.

As shown in FIG. 3, an example image (shown in 304 and 314) depicts a pair of pants with a pattern that includes a number of squares and circles. As can be understood in 304 and 314, a cage model in a rest pose is generated for the image that includes a number of control points. The control points are moved from an initial location shown in 304 and 314 to new locations shown in 306 and 316. The initial locations and new locations of the control points are substantially identical in 306 and 316.

The image in 306 undergoes an interpolant deformation based on the new locations of the control points (namely, cubic MVC). The image in 316 undergoes a conformal deformation based on the new locations of the control points in which each of the pixels undergo a conformal transformation. As can be appreciated from the changes to the edges of the image and the pattern of image, the interpolant deformation of 306 does not preserve local aspects (e.g., local angles and proportions of groups of points) of the deformed image whereas the conformal deformation of 316 preserves local aspects (e.g., local angles and proportions of groups of points) of the deformed image.

FIG. 4 provides another example diagram of cage-based deformation of an exemplary image comparing interpolant cage-based deformation, in accordance with the prior art, to conformal cage-based deformation with polynomial curves, specifically polynomial curves of the third-degree (e.g., cubic Bézier curves), in accordance with embodiments of the present disclosure. Diagram 400 is an example comparing an interpolant cage-based deformation 406 of an example image 402 to a conformal cage-based deformation with polynomial curves 404 of the example image 402.

As shown in FIG. 4, an example image 402 is displayed. Zoomed-in portions of the example image 402 show the eye of the example image 412 and the angle of pixels in a certain portion of the example image 422. As can be understood (but not shown), a rest cage is generated for the image of rest pose 402 that includes a number of control points. The control points are moved from an initial location to new locations thereby changing the curvature of the rest cage. As can be understood (but not shown), the initial locations and new locations of the control points of the cage model are substantially identical in 404 and 406.

The image in 406 undergoes an interpolant deformation based on the new locations of the control points (namely, cubic MVC). The image in 404 undergoes a conformal deformation based on the new locations of the control points. As can be appreciated from the deformation of the image, the interpolant deformation of 406 does not preserve local aspects (e.g., local angles and proportions of groups of points) of the deformed image whereas the conformal deformation of 404 preserves local aspects (e.g., local angles and proportions of groups of points) of the deformed image.

A visual comparison of zoomed-in portions of the example image 402 showing the eye of the example image 412 to the zoomed-in portions of the conformally deformed example image 404 showing the eye of the example image 414 indicates that the proportions of the eyes are maintained during the conformal deformation. Further, a visual comparison of zoomed-in portions of the example image 402 showing the angle of a group of pixels at a certain portion of the example image 422 to the zoomed-in portions of the example image 404 showing the angle of a group of pixels at a certain portion of the example image 424 indicates that the local angle of the group of pixels are maintained during conformal deformation.

On the other hand, a visual comparison of zoomed-in portions of the example image 402 showing the eye of the example image 412 to the zoomed-in portions of the inter-polantly deformed example image 406 showing the eye of the example image 416 indicates that the proportions of the eyes are not maintained during the interpolant deformation. Further, a visual comparison of zoomed-in portions of the example image 402 showing the angle of a group of pixels at a certain portion of the example image 422 to the zoomed-in portions of the example image 406 showing the angle of a group of pixels at a certain portion of the example image 426 indicates that the local angle of the group of pixels are not maintained during interpolant deformation.

Thus, it can be appreciated from FIGS. 3 and 4 that a conformal transformation for a curved cage model preserves local aspects of images, such as angles and proportions of groups of pixels, whereas an interpolant transformation for a curved cage model does not preserve local aspects of images. Further, conventional interpolant deformations are limited in order (e.g., cubic MVC is limited to cubic curves) whereas embodiments presented herein for conformal cage-based deformation with polynomial curves are not limited in degree (e.g., embodiments herein allow for deformation based on polynomial curves of any degree, even orders greater than cubic).

FIG. 5 provide examples of cage-based deformation of exemplary images comparing cage-based deformation techniques, in accordance with the prior art, to conformal cage-based deformation with polynomial curves, in accordance with embodiments of the present disclosure. The cage-based deformation techniques of FIG. 5 compare embodiments described herein regarding conformal polynomial (here, cubic) curve coordinates cage-based deformation to MVC cage-based deformation, Cubic MVC cage-based deformation, and GC cage-based deformation.

As shown in FIG. 5, example images are depicted with rest cages in 502A, 502B, and 502C. The rest cages include a number of control points. The control points are moved from an initial location shown in 502A, 502B, and 502C to new locations for each of the cage-based deformation techniques.

For MVC cage-based deformation, the new locations of the control points cause the images to undergo deformations in 504A, 504B, and 504C. As can be seen, MVC does not allow the cage model to have curved segments. Further, the deformations are non-conformal in that local aspects (e.g., local angles and proportions of groups of points) are not preserved in the deformed image.

For Cubic MVC cage-based deformation, the new locations of the control points cause the images to undergo deformations in 506A, 506B, and 506C. As can be seen, Cubic MVC allows the cage model to have curved segments that are limited to cubic curves. However, the deformations are non-conformal in that local aspects (e.g., local angles and proportions of groups of points) are not preserved in the deformed image.

For GC cage-based deformation, the new locations of the control points cause the images to undergo deformations in 508A, 508B, and 508C. As can be seen, GC does not allow the cage model to have curved segments. However, the deformations are conformal in that local aspects (e.g., local angles and proportions of groups of points) are preserved in the deformed image.

For conformal polynomial curve coordinates, in accordance with embodiments of the present disclosure, the new locations of the control points cause the images to undergo deformations in 510A, 510B, and 510C. As can be seen, conformal polynomial curve coordinates allow the cage model to have curved segments and the deformations are conformal in that local aspects (e.g., local angles and proportions of groups of points) are preserved in the deformed image.

Thus, it can be appreciated from FIG. 5 that conformal polynomial curve coordinates, in accordance with embodiments of the present disclosure, improves cage-based deformation by allowing the cage model to have curved segments while maintaining conformality of the deformed image.

With reference now to FIG. 6, a flow diagram is provided showing an exemplary method 600 related to conformal cage-based deformation with polynomial curves, in accordance with embodiments of the present technology. Each block of method 600 comprises a computing process that can be performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The method flow of FIG. 6 is exemplary only and not intended to be limiting. As can be appreciated, in some embodiments, method flow 600 can be implemented, at least in part, to facilitate conformal cage-based deformation with polynomial curves.

Turning to FIG. 6, a flow diagram is provided showing an embodiment of a method 600 for conformal cage-based deformation with polynomial curves in accordance with embodiments described herein. Such conformal cage-based deformation with polynomial curves can be used to efficiently and effectively deform images based on cage models with curved segments while maintaining conformality of the image. Initially, at block 602, an image is displayed that includes a number of points or pixels. The image can be any image or object. In some embodiments, the image is a 2-d image. At block 604, a cage model can be generated for the image. The boundary of the cage model can be defined by segments between the vertices. In some embodiments, the cage model can be generated around the image via a user selecting vertices of the cage model in a user interface. In some embodiments, the cage model is generated around a portion of the image so that only a portion of the image is subsequently deformed. In some embodiments, the cage model is generated around the entirety of the image so that the entire image is deformed.

In block 606, segments of the cage model are converted into polynomial curves. In this regard, curve control points are generated on each segment when converting the segment from a straight line to a polynomial curve. For example, the user selects The vertices of the segment are curve control points that control the endpoints of the segment/polynomial curve. The curve control points between the endpoints allow the user to adjust the curvature of the segment/polynomial curve. In some embodiments, the curve control points are generated while the polynomial curve is a straight segment. In this regard, the rest cage includes curve control points associated with its segment/polynomial curves. In some embodiments, the degree of the polynomial curve can be specified by the user in the user interface.

In certain embodiments, in block 608, weights (e.g., cage coordinates) are preprocessed for each point or pixel of the image based on the input (rest-pose) cage vertices and number of curve control points. The preprocessed weights are calculated to generate a conformal transformation of each pixel of the image based on movement of the curve control points. In some embodiments, the preprocessing of weights occurs after generation of the curve control points (e.g., after the user selects the degree of the polynomial curve of the segment(s)) and while the cage model is in its rest pose while its segments/polynomial curves are straight lines. In this regard, weights (e.g., cage coordinates) are calculated for each pixel of the image based on the locations of the curve control points in their initial locations on the straight segments/polynomial curves. However, in other embodiments, no preprocessing of weights (e.g., cage coordinates) occurs.

In block 610, input is received deforming the cage model from the rest pose. In some embodiments, the user selects and moves one or more of the curve control points deforming the boundary of the cage model and the curvature of the boundary of the cage model. In block 612, the image is deformed by performing a conformal transformation of each pixel of the image within the boundary of the rest pose of the cage model based on the deformation of the cage model from the rest pose of the cage model. In some embodiments, the weights (e.g., cage coordinates) are used in the deformation of the image so that the deformed image can be displayed in real-time or as close to real-time as possible during deformation of the cage model. In block 614, the deformed image is displayed in the user interface. In some embodiments, for subsequent deformations of the cage model, the subsequent deformation of the image is performed by a conformal transformation of each pixel of the image within the boundary of the rest pose of the cage model based on the subsequent deformation of the cage model from the rest post of the cage model.

Having briefly described an overview of aspects of the technology described herein, an exemplary operating environment in which aspects of the technology described herein may be implemented is described below in order to provide a general context for various aspects of the technology described herein.

Figure 7:
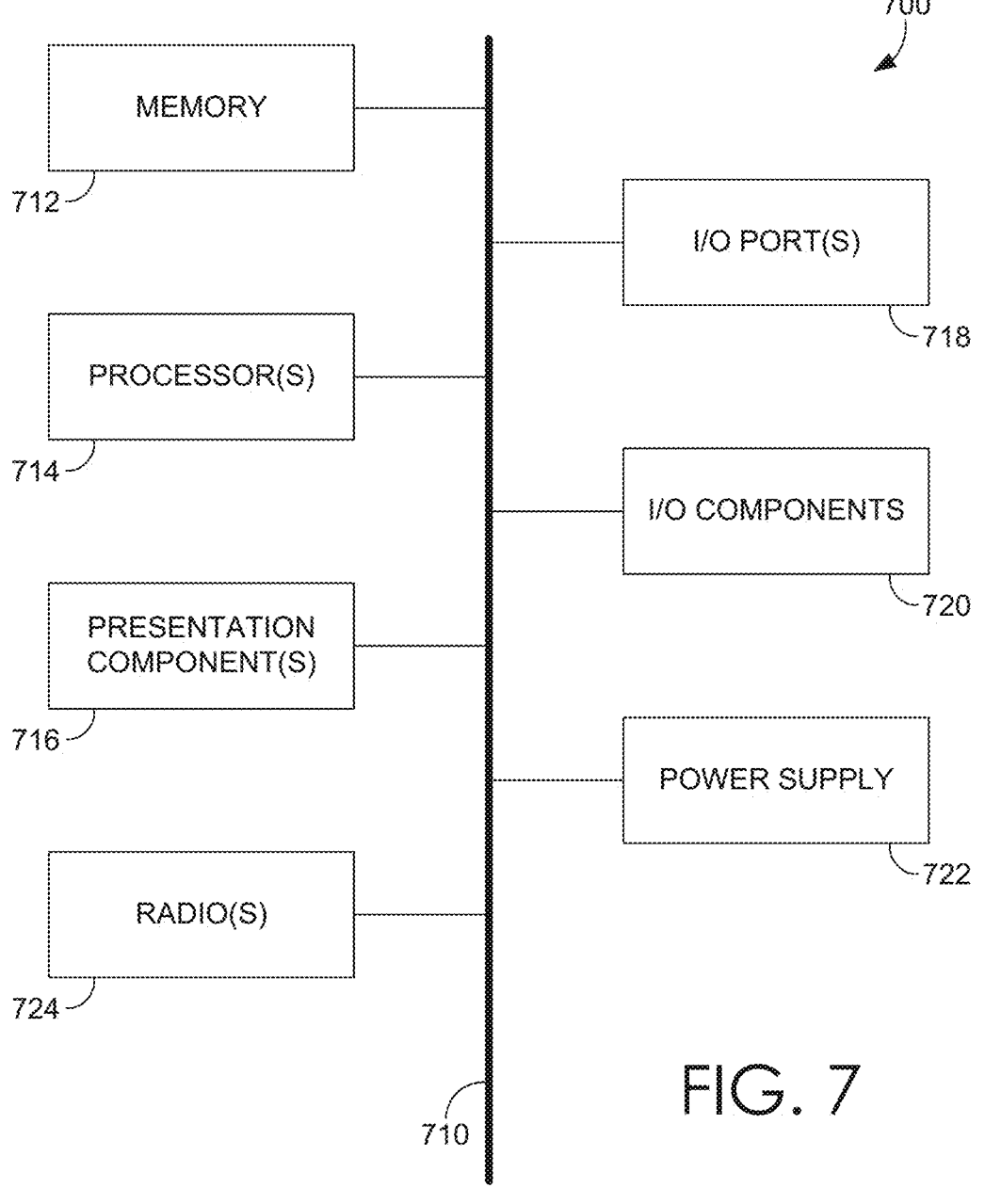
FIG. 7 is a block diagram of an example computing device in which embodiments of the present disclosure can be employed.

Referring to the drawings in general, and initially to FIG. 7 in particular, an exemplary operating environment for implementing aspects of the technology described herein is shown and designated generally as computing device 700. Computing device 700 is just one example of a suitable computing environment and is not intended to suggest any limitation as to the scope of use or functionality of the technology described herein. Neither should the computing device 700 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, an illustrative power supply 722, and a radio(s) 724. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 7 is merely illustrative of an exemplary computing device that can be used in connection with one or more aspects of the technology described herein. Distinction is not made between such categories as "workstation," "server," "laptop," and "handheld device," as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Exemplary memory includes solid-state memory, hard drives, and optical-disc drives. Computing device 700 includes one or more processors 714 that read data from various entities such as bus 710, memory 712, or I/O components 720. Presentation component(s) 716 present data indications to a user or other device. Exemplary presentation components 716 include a display device, speaker, printing component, and vibrating component. I/O port(s) 718 allow computing device 700 to be logically coupled to other devices including I/O components 720, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 700. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include radio(s) 724. The radio 724 transmits and receives radio communications. The computing device may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive. The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

What is claimed is:

1. A computer-implemented method comprising:

causing display of a two-dimensional (2-D) image and a cage model in a first configuration, the 2-D image comprising a plurality of points, each point of the plurality of points corresponding to a location of a corresponding pixel of the 2-D image, the cage model in the first configuration defining an outer boundary of at least a portion of the plurality of points of the 2-D image, the cage model comprising vertices that define corresponding endpoints of the outer boundary of the cage model, and the cage model only comprising the vertices on the outer boundary;

generating curve control points between the vertices for at least an outer boundary portion of the outer boundary of the first configuration of the cage model, the curve control points configured to adjust corresponding curvature of polynomial curves defining the outer boundary of the cage model;

preprocessing weights for each point in the portion of the plurality of points of the 2-D image based only on a relationship of each point to initial locations of all of the vertices of the cage model in the first configuration and a total number of the curve control points for all of the polynomial curves defining the outer boundary of the cage model;

deforming, responsive to receiving a request, the cage model from the first configuration to a second configuration, wherein at least one curve control point is at a different location in the second configuration thereby changing curvature of a corresponding polynomial curve defining a corresponding portion of the outer boundary of the cage model in the first configuration to a corresponding deformed polynomial curve in the second configuration;

generating, based on the first configuration and the second configuration of the cage model, an updated 2-D image by performing a conformal transformation of each point in the portion of the plurality of points of the 2-D image within the outer boundary of the cage model in the first configuration to update the location of each corresponding pixel with respect to the second configuration, the conformal transformation of each point computed based only on the weights for each point and the corresponding deformed polynomial curve in the second configuration; and causing display of the updated 2-D image.

2. The computer-implemented method of claim 1, wherein causing display of the 2-D image and the cage model in the first configuration further comprises:

causing display of the 2-D image;

receiving a vertex coordinate for each vertex of the cage model; and generating the cage model based on the vertex coordinate for each vertex of the cage model, wherein the vertices define the corresponding endpoints of each segment of the outer boundary of the cage model; and wherein the curve control points comprise endpoint curve control points generated at the corresponding endpoints of each segment and at least one intermediate curve control point generated between the corresponding endpoints on each segment.

3. The computer-implemented method of claim 2, wherein each segment of the cage model in the first configuration is a corresponding straight segment and the curve control points are generated on each corresponding straight segment.

4. The computer-implemented method of claim 3, wherein the curve control points are generated on each corresponding straight segment by converting each corresponding straight segment into a corresponding one of the polynomial curves defining the cage model.

5. The computer-implemented method of claim 4, wherein the curve control points comprise additional intermediate curve control points generated between the corresponding endpoints of each of the polynomial curves, thereby increasing a corresponding degree of each of the polynomial curves.

6. The computer-implemented method of claim 1, further comprising:

preprocessing the weights for each point in the portion of the plurality of points of the 2-D image within the outer boundary of the cage model in the first configuration prior to deforming the cage model from the first configuration to the second configuration.

7. The computer-implemented method of claim 1, further comprising:

deforming, responsive to receiving a subsequent request, the cage model from the second configuration to a third configuration; and generating a further updated 2-D image by performing the conformal transformation of each point in the portion of the plurality of points of the 2-D image within the outer boundary of the cage model based on the weights and deformation of a polynomial curve of the outer boundary of the cage model in the third configuration with respect to the first configuration of the cage model.

8. The computer-implemented method of claim 1, wherein the conformal transformation of each point preserves local angles and proportions around each point from the 2-D image to the updated 2-D image.

9. One or more computer storage media having a plurality of executable instructions embodied thereon, which, when executed by one or more processors, cause the one or more processors to perform a method comprising:

causing display of a two-dimensional (2-D) image and a 2-D cage model in a rest configuration, the 2-D image comprising a plurality of points, each point of the plurality of points corresponding to a location of a corresponding pixel of the 2-D image, and the 2-D cage model defining an outer boundary of at least a portion of the plurality of points of the 2-D image;

generating curve control points for the 2-D cage model in the rest configuration, each curve control point controlling curvature of a corresponding segment of the 2-D cage model, each corresponding segment of the 2-D cage model corresponding to a polynomial curve defining the outer boundary of the 2-D cage model, the curve control points including:

an endpoint curve control point at each vertex of vertices of the outer boundary of the 2-D cage model, wherein each vertex of the vertices defines an endpoint of each segment of the outer boundary of the 2-D cage model, and the 2-D cage model only comprising the vertices on the outer boundary of the 2-D cage model; and one or more intermediate curve control points for at least one segment of the 2-D cage model between corresponding vertices of the at least one segment;

determining weights for each point in the portion of the plurality of points of the 2-D image within the outer boundary of the 2-D cage model in the rest configuration based on conformal transformation of each point, wherein the weights are based only on a relationship between each point to initial locations of all of the vertices of the 2-D cage model and a total number of the curve control points on all segments of the outer boundary of the 2-D cage model;

deforming, responsive to receiving a request, the 2-D cage model from the rest configuration to an updated configuration, the updated configuration being different from the rest configuration by changing curvature of a corresponding polynomial curve of the outer boundary of the 2-D cage model in the rest configuration to a corresponding deformed polynomial curve in the updated configuration;

generating, based on the weights for each point and corresponding locations of the curve control points of the 2-D cage model in the updated configuration, an updated 2-D image by determining a subsequent location for each point in the portion of the plurality of points of the 2-D image within the outer boundary of the 2-D cage model in the rest configuration to update the location of each corresponding pixel with respect to the updated configuration, wherein the subsequent location is computed based only on the weights for each point and the corresponding locations of the curve control points of the 2-D cage model in the updated configuration; and causing display of the updated 2-D image.

10. The one or more computer storage media of claim 9, wherein causing display of the 2-D image and the 2-D cage model in the rest configuration further comprises:

causing display of the 2-D image;

receiving a vertex coordinate for each vertex of the 2-D cage model; and generating the 2-D cage model based on the vertex coordinate for each vertex of the 2-D cage model.

11. The one or more computer storage media of claim 9, wherein each segment of the outer boundary of the 2-D cage model in the rest configuration is a corresponding straight segment, the curve control points are generated on each corresponding straight segment in the rest configuration, and the weights are determined in the rest configuration.

12. The one or more computer storage media of claim 9, wherein the one or more intermediate curve control points are generated on each corresponding straight segment by converting each corresponding straight segment into each polynomial curve defining the 2-D cage model in response to receiving a degree of each polynomial curve defining the 2-D cage model.

13. The one or more computer storage media of claim 9, wherein deforming of the 2-D cage model from the rest configuration to the updated configuration further comprises a different location for at least one of the one or more intermediate curve control points.

14. The one or more computer storage media of claim 9, wherein additional intermediate curve control points are generated between endpoints of each polynomial curve defining the 2-D cage model, thereby increasing a corresponding degree of each polynomial curve.

15. The one or more computer storage media of claim 9, the method further comprising:

deforming, responsive to receiving a subsequent request, the 2-D cage model from the updated configuration to a further updated configuration; and generating, based on the weights for each point and the curve control points of the 2-D cage model in the further updated configuration with respect to the rest configuration of the 2-D cage model, a further updated 2-D image.

16. The one or more computer storage media of claim 9, wherein generating the updated 2-D image conformally transforms each point by preserving local angles and proportions around each point from the 2-D image to the updated 2-D image.

17. A computing system comprising:

a processor; and a non-transitory computer-readable medium having stored thereon instructions that when executed by the processor, cause the processor to perform operations including:

causing display of an image and a two-dimensional (2-D) cage model in a first configuration, the image comprising a plurality of points, each point of the plurality of points corresponding to a location of a corresponding pixel of the image, the 2-D cage model defining an outer boundary of at least a portion of the plurality of points of the image, the 2-D cage model comprising vertices that define corresponding endpoints of the outer boundary of the 2-D cage model, and the 2-D cage model only comprising the vertices on the outer boundary;

generating curve control points between the vertices on at least a portion of the outer boundary of the first configuration of the 2-D cage model, the curve control points configured to adjust corresponding curvature of polynomial curves defining the outer boundary of the 2-D cage model;

preprocessing weights for each point in the portion of the plurality of points of the image based only on a relationship of each point to initial locations of all of the vertices of the 2-D cage model in the first configuration and a total number of the curve control points for all of the polynomial curves defining the outer boundary of the 2-D cage model;

deforming the 2-D cage model from the first configuration to a second configuration, wherein at least one curve control point is at a different location in the second configuration thereby changing curvature of a corresponding polynomial curve defining a corresponding portion of the outer boundary of the 2-D cage model in the first configuration to a corresponding deformed polynomial curve in the second configuration;

generating, based on the first configuration and the second configuration of the 2-D cage model, an updated image by performing a conformal transformation at each point in the portion of the plurality of points of the image within the outer boundary of the 2-D cage model in the first configuration to update the location of each corresponding pixel with respect to the second configuration, the conformal transformation of each point computed based only on the weights for each point and the corresponding deformed polynomial curve in the second configuration, wherein the conformal transformation of each point preserves local angles and proportions around each point from the image to the updated image; and causing display of the updated image.

18. The computing system of claim 17, wherein causing display of the image and the 2-D cage model in the first configuration further comprises:

causing display of the image;

receiving a vertex coordinate for each vertex of the 2-D cage model; and generating the 2-D cage model based on each vertex coordinate of the vertices of the 2-D cage model, wherein the vertices define the corresponding endpoints of each segment of the outer boundary of the 2-D cage model;

wherein the curve control points comprise endpoint curve control points generated at the corresponding endpoints of each segment of the outer boundary of the 2-D cage model and at least one intermediate curve control point generated between endpoints on one or more segments of the 2-D cage model; and wherein each segment of the outer boundary of the 2-D cage model in the first configuration is a corresponding straight segment and the curve control points are generated on each corresponding straight segment.

19. The computing system of claim 18, wherein the curve control points are generated on each corresponding straight segment by converting each corresponding straight segment into a corresponding one of the polynomial curves defining the 2-D cage model in response to receiving a degree of the polynomial curves for the 2-D cage model.

20. The computing system of claim 17, the operations further including:

preprocessing the weights for each point in the portion of the plurality of points of the image within the outer boundary of the 2-D cage model in the first configuration prior to deforming the 2-D cage model from the first configuration to the second configuration.

* * * * *